United States Patent
Obata

(10) Patent No.: US 10,994,719 B2
(45) Date of Patent: May 4, 2021

(54) METHOD AND DEVICE FOR CONTROLLING HYBRID VEHICLE

(71) Applicant: NISSAN MOTOR CO., LTD., Yokohama (JP)

(72) Inventor: Takeaki Obata, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 16/636,368

(22) PCT Filed: Aug. 10, 2017

(86) PCT No.: PCT/JP2017/029175
§ 371 (c)(1),
(2) Date: Feb. 4, 2020

(87) PCT Pub. No.: WO2019/030911
PCT Pub. Date: Feb. 14, 2019

(65) Prior Publication Data
US 2020/0164854 A1 May 28, 2020

(51) Int. Cl.
*B60W 20/00* (2016.01)
*B60K 6/46* (2007.10)
*B60W 50/14* (2020.01)

(52) U.S. Cl.
CPC .......... *B60W 20/00* (2013.01); *B60K 6/46* (2013.01); *B60W 50/14* (2013.01); *B60W 2510/085* (2013.01); *B60W 2520/10* (2013.01); *B60W 2530/209* (2020.02); *B60W 2552/15* (2020.02); *B60W 2554/406* (2020.02); *B60Y 2200/92* (2013.01); *B60Y 2300/91* (2013.01)

(58) Field of Classification Search
None
See application file for complete search history.

(56) References Cited

U.S. PATENT DOCUMENTS

| 2010/0299010 A1 | 11/2010 | Balmy |
| 2011/0276206 A1 | 11/2011 | Tofukuji et al. |
| 2016/0061610 A1* | 3/2016 | Meyer .................. G01C 21/26 701/22 |
| 2017/0191844 A1* | 7/2017 | Gutruf ............... G01C 21/3614 |

FOREIGN PATENT DOCUMENTS

| CN | 106915260 A | 7/2017 |
| JP | 2012-101616 A | 5/2012 |
| JP | 2013-072804 A | 4/2013 |
| JP | 2013-152149 A | 8/2013 |
| WO | WO 2011/114486 A1 | 9/2011 |

* cited by examiner

*Primary Examiner* — Jonathan M Dager
*Assistant Examiner* — Garrett F Evans
(74) *Attorney, Agent, or Firm* — Foley & Lardner LLP

(57) ABSTRACT

A method of controlling the hybrid vehicle in which electric power of the battery and electric power generated by an electric generator are supplied to a drive device, a running load of the drive motor is estimated on the basis of the driver's requirement, and a first distance to empty that allows for running in a state where the estimated running load is fulfilled is calculated on the basis of an amount of charge remaining in the battery and an amount of fuel remaining used to drive the fuel cell. Then, a required running distance is estimated on the basis of the driver's requirement, and, on the basis of the first distance to empty and the required running distance, a necessary energy replenishment operation is notified to the driver.

11 Claims, 13 Drawing Sheets

| VEHICLE SPEED km/h | CURRENT DISTANCE TO EMPTY km | INCREASE OF DISTANCE DUE TO CHARGING km | INCREASE OF DISTANCE DUE TO REFUELING km | ERROR % |
|---|---|---|---|---|
| 20 | 320 | 180 | 300 | 67 |
| 40 | 256 | 144 | 240 | 67 |
| 60 | 192 | 108 | 180 | 67 |
| 80 | 165 | 93 | 155 | 67 |
| 85 | 85 | 165 | 0 | −100 |
| 90 | 45 | 192 | 0 | −100 |
| 95 | 32 | 195 | 0 | −100 |
| 100 | 25 | 192 | 0 | −100 |
| 120 | 14 | 127 | 0 | −100 |

FIG. 9

AMOUNT OF OUTPUTTABLE ELECTRIC POWER OF BATTERY=10kWh
AMOUNT OF REMAINING FUEL ELECTRIC POWER=15kWh

| REQUIRED POWER OUTPUT kW | AVERAGE VEHICLE SPEED km/h | MAXIMUM POWER OUTPUT OF SOFC kW | TOTAL DISTANCE TO EMPTY B km | TOTAL DISTANCE TO EMPTY B km | ERROR km | ERROR % |
|---|---|---|---|---|---|---|
| 20 | 100 | 15 | 125 | 200 | -75 | -37.5 |
| 25 | 120 | 15 | 100 | 120 | -20 | -16.6 |
| 30 | 140 | 15 | 83.3 | 93.3 | -10 | -10.7 |

FIG. 11

METHOD AND DEVICE FOR CONTROLLING HYBRID VEHICLE

TECHNICAL FIELD

The present invention relates to a method and a device for controlling a hybrid vehicle.

BACKGROUND ART

There is conventionally known a series hybrid vehicle that is an electric vehicle, which is caused to run by a motor as a load being driven by electric power of a battery, loaded with, as a so-called range extender, an electric generator which charges the battery or directly supplies electric power to the motor. For example, JP2012-101616 A has disclosed a series hybrid vehicle with an electric generator driven by an internal-combustion engine. Then, in the above-mentioned patent document, a value obtained by adding a distance to empty calculated on the basis of a current amount of charge remaining in a battery and a distance to empty calculated on the basis of electric power obtained by using all the amount of fuel remaining in a fuel tank to drive the internal-combustion engine to generate is set as a total distance to empty.

SUMMARY OF INVENTION

Incidentally, in a series hybrid vehicle, if a battery has run out of power, a motor is directly driven by electric power generated by an electric generator. At this time, in a case where a required running power output is lower than a generating power output of the electric generator, the vehicle can continue running only on the generating power output of the electric generator; therefore, as with the conventional technology, a distance to empty can be calculated from a total amount of energy obtained by adding an amount of charge remaining in the battery and an amount of fuel remaining. However, in a case where a required running power output exceeds a generating power output of the electric generator, it takes more than the generating power output of the electric generator for the vehicle to continue running. That is, a distance to empty when on running, including high-load running in which a required running power output exceeds a generating power output of the electric generator, cannot be calculated from a total amount of energy obtained by simply adding an amount of charge remaining in the battery and an amount of fuel remaining.

That is, a distance to empty from the present time may change depending on the magnitude of a required running power output on a route to a destination, thus an increase of the distance to empty may greatly change depending on whether energy replenishment to be made is battery charging or refueling for the electric generator to generate power.

Accordingly, it may be difficult for a driver to determine whether battery charging or refueling is necessary energy replenishment to arrive at a destination, which becomes a problem.

The present invention is intended to provide a method and a device of notifying a driver of whether battery charging or refueling is necessary energy replenishment.

According to an embodiment of present invention, in the method of controlling the hybrid vehicle in which electric power of the battery and electric power generated by an electric generator are supplied to a drive device, a running load of the drive motor is estimated on the basis of the driver's requirement, and a first distance to empty that allows for running in a state where the estimated running load is fulfilled is calculated on the basis of an amount of charge remaining in the battery and an amount of fuel remaining used to drive the fuel cell. Then, a required running distance is estimated on the basis of the driver's requirement, and on the basis of the first distance to empty and the required running distance, a necessary energy replenishment operation is notified to the driver.

BRIEF DESCRIPTION OF DRAWINGS

FIG. 9 is a diagram illustrating what degree of error an increase of the distance to empty has in a case where a wrong energy replenishment operation is made.

FIG. 11 is a diagram that compares a total distance to empty A and a total distance to empty B.

DESCRIPTION OF EMBODIMENTS

First Embodiment

Figure 1:
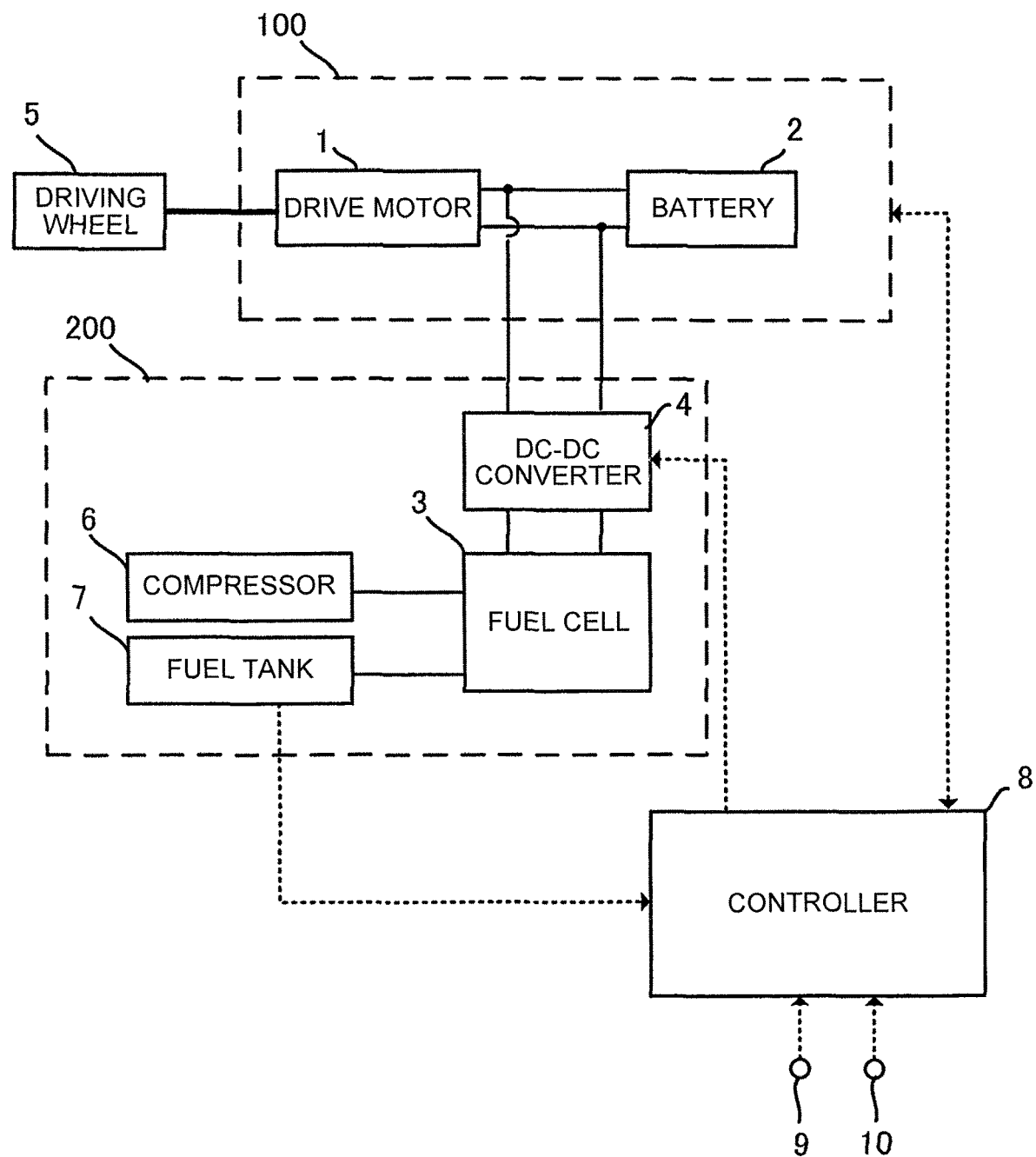
FIG. 1 is a system configuration diagram of a series hybrid vehicle.

FIG. 1 is a system configuration diagram of a series hybrid vehicle to which a first embodiment of the present invention is applied. This hybrid vehicle is a so-called series hybrid vehicle that is caused to run by supplying electric power of a battery and electric power generated by an electric generator to a motor 1 (hereinafter, referred to as a "drive motor") that is a drive device.

This hybrid vehicle includes an external load 100 that includes the drive motor 1 and a battery 2, a fuel cell system 200 as an electric generator, and a controller 8.

The fuel cell system 200 includes a fuel cell stack 3, a compressor 6 that supplies cathode gas to the fuel cell stack 3, a fuel tank 7 in which fuel to be supplied to the fuel cell stack 3 is stored, and a DC-DC converter 4 that boosts electric power generated by the fuel cell stack 3.

The fuel cell stack 3 (hereinafter, also referred to as the "fuel cell 3") is a solid oxide fuel cell (SOFC).

In the fuel tank 7, fuel for reforming made from a liquid that is, for example, a mixture of ethanol and water is stored. It is to be noted that the fuel cell system 200 in FIG. 1 is a simplified one that a reformer, a fuel pump, an evaporator, a heat exchanger, etc. are omitted.

The DC-DC converter 4 is an electric power regulator that boosts the voltage of the fuel cell stack 3 with respect to respective voltages of the drive motor 1 and the battery 2 so that electric power generated by the fuel cell stack 3 is pulled into the drive motor 1 and the battery 2. The DC-DC converter 4 is connected in parallel to the fuel cell stack 3, and boosts the output voltage of the primary-side fuel cell stack 3 and supplies generated electric power to the secondary-side external load 100. The DC-DC converter 4 boosts, for example, an voltage of tens of volts output from the fuel cell stack 3 to a voltage level of several hundred volts so that the external load 100 is supplied with electric power.

The drive motor 1 is connected to both the battery 2 and the DC-DC converter 4 through inverters (not shown). The drive motor 1 is a source of power that drives the vehicle. Furthermore, using a braking force required in a case of braking the vehicle, the drive motor 1 can generate regenerative electric power and charge the battery 2 with this regenerative electric power.

The battery 2 is a power supply source that supplies electric power stored therein to the drive motor 1. In the present embodiment, the battery 2 is a main power supply source, and the fuel cell 3 is mainly used for charging the battery 2 when an amount of charge of the battery 2 has become low. Furthermore, the electric power of the fuel cell 3 may be supplied to the drive motor 1.

The controller 8 includes, for example, a central processing unit (CPU), a read-only memory (ROM), a random access memory (RAM), and an input/output interface (I/O interface), and executes a specific program, thereby performing a process for controlling the fuel cell system 200 and the external load 100.

The controller 8 receives signals output from a current sensor 9, an accelerator position sensor 10, and other various sensors, and, in response to these signals, acquires an amount of charge remaining in the battery 2 and an amount of fuel remaining that the fuel cell 3 can use to generate electric power, acquires a required vehicle speed or a required running power output that a driver requires, and calculates a distance to empty based on the required vehicle speed or the required running power output.

Furthermore, in addition to the above-described distance to empty, the controller 8 calculates a distance to empty in a case where an energy replenishing operation is performed, i.e., at least either in a case where the battery 2 is charged or in a case where the vehicle is refueled. Then, the controller 8 notifies of (indicates) respective distances to empty on these conditions to the driver. Details of how to calculate these distances to empty and details of contents of the notification to the driver will be described later. It is to be noted that the controller 8 includes, as functional units for realizing the above functions, at least, a running load estimating unit, a first distance to empty estimating unit, a required running distance estimating unit, and a notifying unit (details of these units will be described later). Then, the controller 8 controls respective operating states of the drive motor 1, the fuel cell system 200, etc. on the basis of these acquired or calculated values.

Moreover, an operation unit (not shown) is connected to the controller 8. The operation unit outputs a start command signal or a stop command signal to cause the fuel cell system 200 to start or stop. The operation unit includes an EV key, and, when the EV key has been turned ON by an occupant, outputs the start command signal to the controller 8, or, when the EV key has been turned OFF, outputs the stop command signal to the controller 8.

In a case where the controller 8 has received the start command signal from the operation unit, the controller 8 performs start operation to cause the fuel cell system 200 to start, and, after completion of the start operation, performs power generation operation to control power generation of the fuel cell stack 3 depending on the operating state of the external load 100. It is to be noted that the fuel cell system 200 may be caused to start when an amount of charge of the battery 2 has reached or dropped below a predetermined value in need of power generation.

In the power generation operation, the controller 8 finds electric power required of the fuel cell stack 3 depending on the operating state of the external load 100. Then, on the basis of the required electric power, the controller 8 calculates respective supply flow rates of cathode gas and anode gas required for power generation of the fuel cell stack 3, and supplies the fuel cell stack 3 with cathode gas and anode gas at the calculated supply flow rates. Then, the controller 8 performs switching control on the DC-DC converter 4 and supplies electric power output from the fuel cell system 200 to the external load 100.

That is, the controller 8 controls the respective flow rates of cathode gas and anode gas on the basis of the electric power required of the fuel cell stack 3, and controls the amount of electric power generated by the fuel cell stack 3. For example, the electric power required of the fuel cell stack 3 increases with an increase in the accelerator pedal depression amount. Thus, the larger the accelerator pedal depression amount, the higher the respective supply flow rates of cathode gas and anode gas supplied to the fuel cell stack 3. It is to be noted that the cathode gas supplied to the fuel cell stack 3 may be controlled on the basis of a deviation between a target temperature and an actual temperature of the fuel cell stack 3. In a case where the actual temperature is higher than the target temperature, when the deviation is large, the supply of cathode gas is increased as compared with when the deviation is small.

Furthermore, in a state where the EV key is ON and in a system state where power supply from the fuel cell system 200 to the external load 100 is shut off, the controller 8 performs self-sustaining operation to suppress power generation of the fuel cell stack 3 and maintain the fuel cell in a state fitting for power generation. Hereinafter, the system state where power supply from the fuel cell system 200 to the external load 100 is shut off is referred to as an "idling stop (IS) state", and the self-sustaining operation is referred to as "IS operation".

In a case where the electric power required of the fuel cell stack 3 has become a predetermined value, for example, zero, the operation state of the fuel cell system 200 makes transition from power generation operation to IS operation. Then, the controller 8 controls the DC-DC converter 4, and shuts off the power supply from the fuel cell system 200 to the external load 100.

Accordingly, during the IS operation, electric power generated by the fuel cell stack 3 may be supplied to an auxiliary machine provided in the fuel cell system 200, or the electric power may not be supplied from the fuel cell stack 3 to the auxiliary machine.

In a case where the controller 8 has received the stop command signal from the operation unit, the controller 8 performs stop operation to stop the operation of the fuel cell system 200.

FIGS. 2A to 2D are diagrams illustrating types of power supply to the external load 100 in the fuel cell system 200 in a state where the EV key is ON.

Figure 2A:
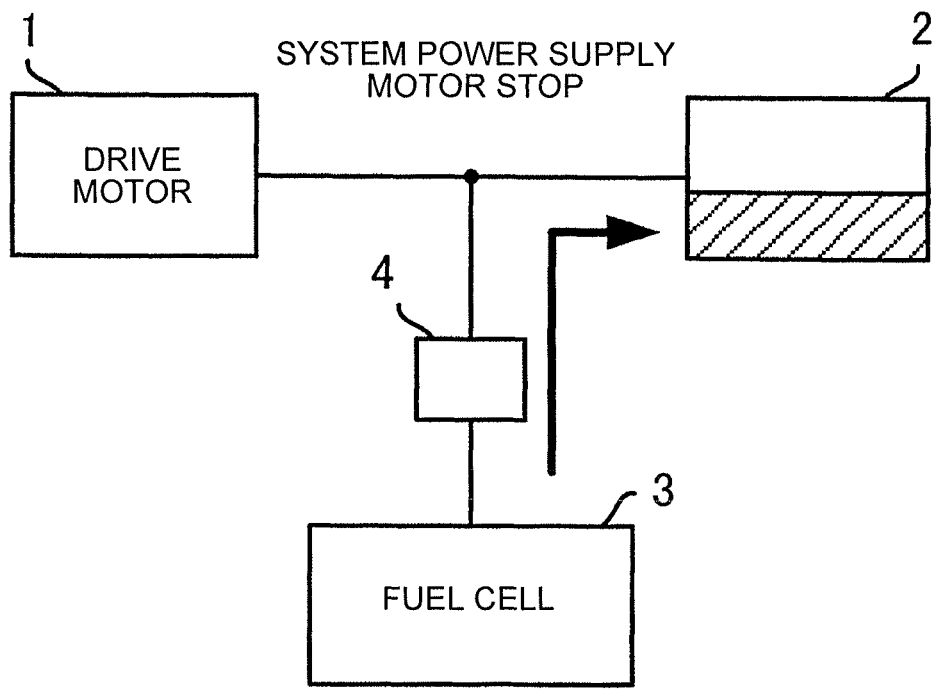
FIG. 2A is a first diagram illustrating a type of power supply from a fuel cell system to an external load.

FIG. 2A is a concept diagram showing a state where the drive motor 1 is stopped and a state where the battery 2 is being supplied with electric power from the fuel cell system 200. The state shown in FIG. 2A is likely to occur when the vehicle is in a stop state, and the amount of charge of the battery 2 is low.

Figure 2B:
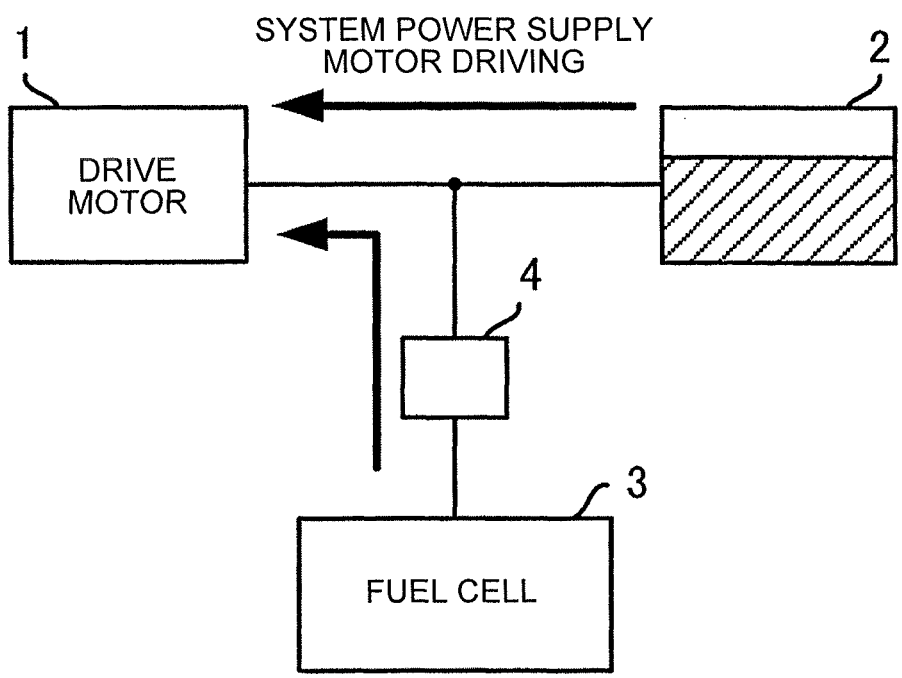
FIG. 2B is a second diagram illustrating a type of power supply from the fuel cell system to the external load.

FIG. 2B is a concept diagram showing a state where the drive motor 1 is in power running and a state where the drive motor 1 is being supplied with electric power from both the fuel cell system 200 and the battery 2. The state shown in FIG. 2B is likely to occur when the vehicle is in an accelerated state, and the load (the power output) of the drive motor 1 is high.

Figure 2C:
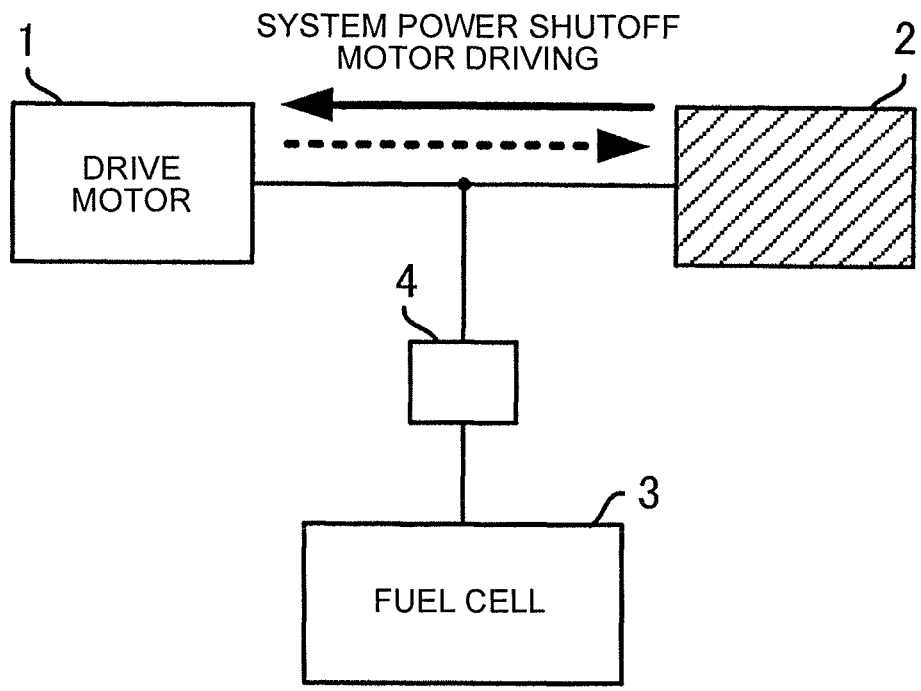
FIG. 2C is a third diagram illustrating a type of power supply from the fuel cell system to the external load.

FIG. 2C is a concept diagram showing a state where the drive motor 1 is in power running or in regeneration and a state where power supply from the fuel cell system 200 to both the drive motor 1 and the battery 2 is shut off. The state shown in FIG. 2C is likely to occur when the drive motor 1 is in a state of being driven at low load or medium load while the vehicle is running, and the battery 2 is fully charged. Furthermore, it is also likely to occur when the vehicle is in a decelerated state, and the capacity of the battery 2 has room to be charged.

Figure 2D:
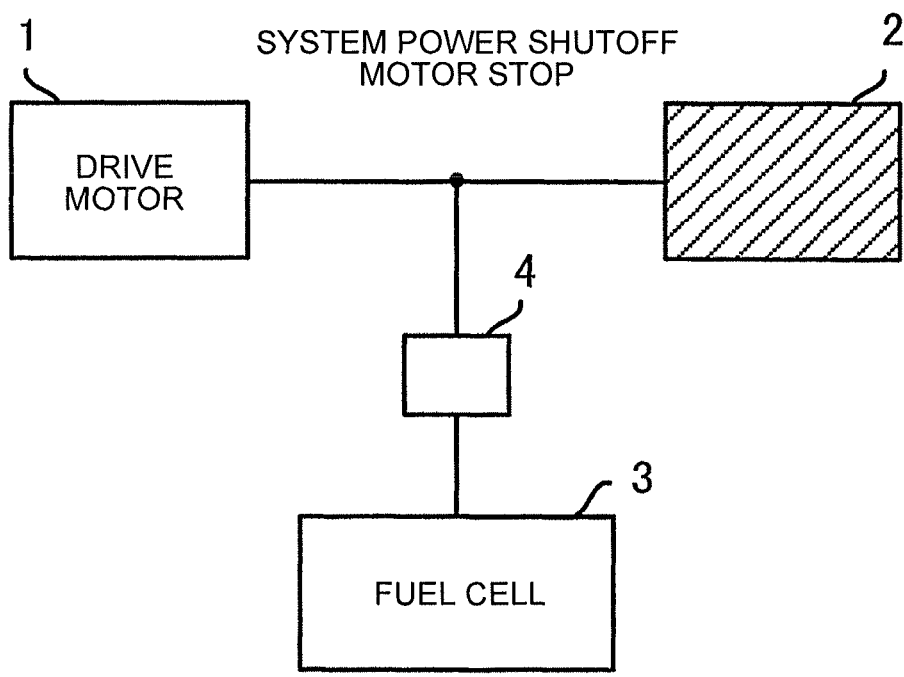
FIG. 2D is a fourth diagram illustrating a type of power supply from the fuel cell system to the external load.

FIG. 2D is a concept diagram showing a state where the drive motor 1 is stopped and a state where the battery 2 is fully charged. The state shown in FIG. 2D is likely to occur when the vehicle is in a stop state, and the battery 2 is fully charged.

In this way, of the states shown in FIGS. 2A to 2D, the states shown in FIGS. 2C and 2D, i.e., a system state where power supply from the fuel cell system 200 to both the drive motor 1 and the battery 2 is shut off falls into the IS state of the fuel cell system 200. When it goes into the IS state, the external load 100 sends an IS operation request to the fuel cell system 200.

Therefore, the fuel cell system 200 may go into the IS state, for example, in a case where the battery 2 has been fully charged by a regeneration operation on the drive motor 1 while the vehicle is running or in a case where the vehicle is running or at a stop with the battery 2 fully charged. In such a case, electric power required of the fuel cell stack 3 is zero, and IS operation is performed.

Here, there are described a relationship between a required running power output and a distance to empty and changes in the distance to empty caused by differences in a remaining amount of fuel (an amount of fuel remaining) required for power generation of the fuel cell 3 and an amount of charge remaining in the battery 2 (a battery SOC).

Figure 3:
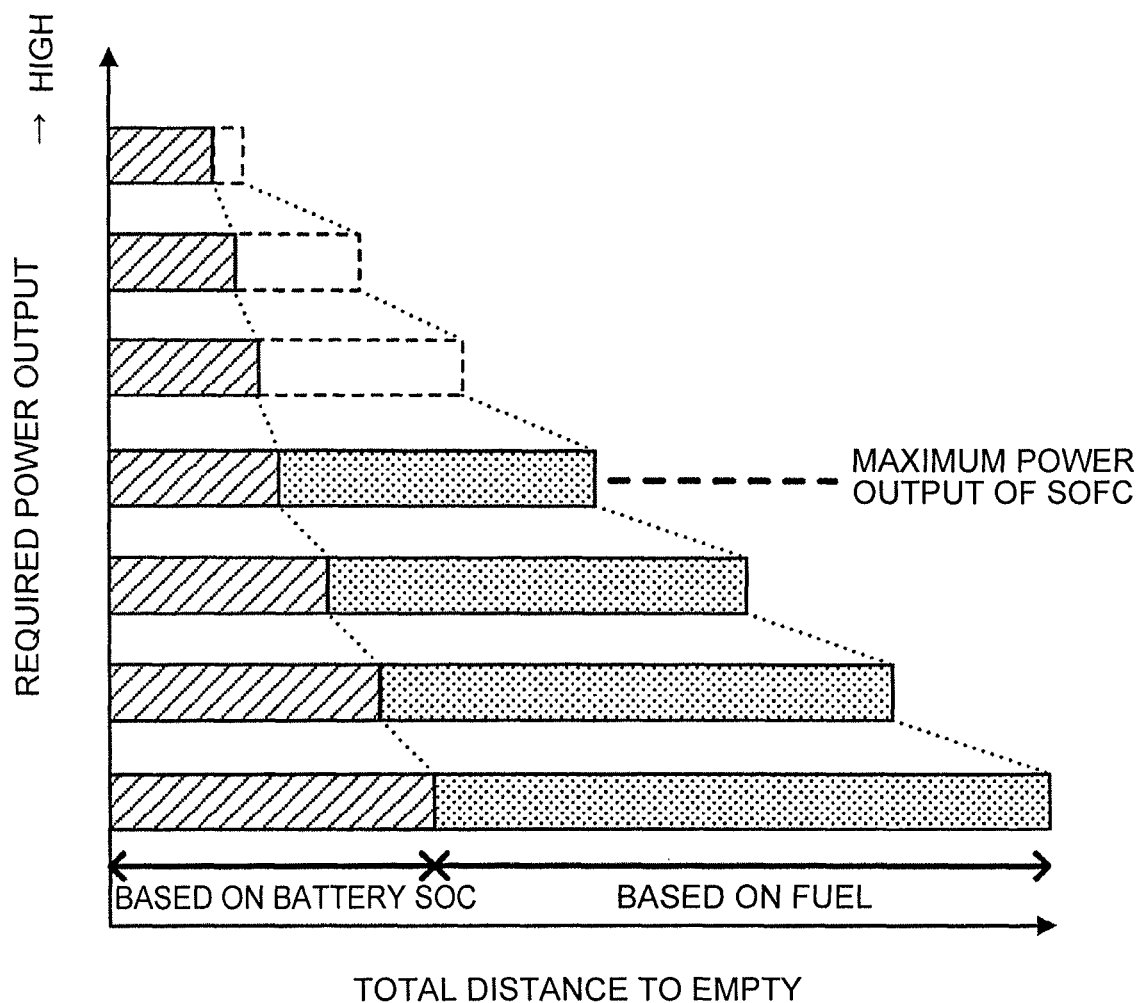
FIG. 3 is a diagram for explaining a relationship between a required power output and a total distance to empty.

FIG. 3 is a diagram for explaining a relationship between a required running power output and a total distance to empty. In the drawing, "based on battery SOC" means a distance to empty on electric power of the battery 2, and "based on fuel" means a distance to empty on electric power generated by the fuel cell stack 3.

In the hybrid vehicle according to the present embodiment, electric power that can be used for the vehicle to run is electric power of the battery 2 and electric power generated by the fuel cell 3. Then, the higher the required running power output, the larger the amount of electric power consumption; thus, a distance to empty based on battery SOC and a distance to empty based on fuel become shorter. Therefore, it is thought that a total distance to empty can be accurately estimated by adding the distance to empty based on battery SOC and the distance to empty based on fuel.

However, as described below, in the above-described calculation method, a calculated value may be incorrect as an estimate of the total distance to empty.

The fuel cell stack 3 used in the present embodiment is assumed to be the one whose generating power output is a low power output of about 10 to 20 kW.

Meanwhile, a power output required when the vehicle runs (also referred to as a "vehicle required power output" or simply as a "required power output") is equal to or less than the above-described generating power output on low-load running such as a case of running in a city area. However, on high-load running such as a case of running on an expressway, a vehicle required power output is higher than the generating power output of the fuel cell stack 3.

Accordingly, if all of electric power of the battery 2 has been used up, for example, in the middle of high-load running, it takes more than the fuel cell stack 3 to generate the vehicle required power output, thus it is not possible to continue the high-load running. That is, in a region where a required power output is higher than the maximum power output of the SOFC in FIG. 3, a distance to empty based on fuel indicated by a broken line becomes a distance to empty on a power output lower than the required power output. Therefore, a value obtained by simply adding a distance to empty based on battery SOC and a distance to empty based on fuel becomes a value diverging from an actual distance to empty on the required power output, and thus is not correct as an estimate of a total distance to empty.

Figure 4:
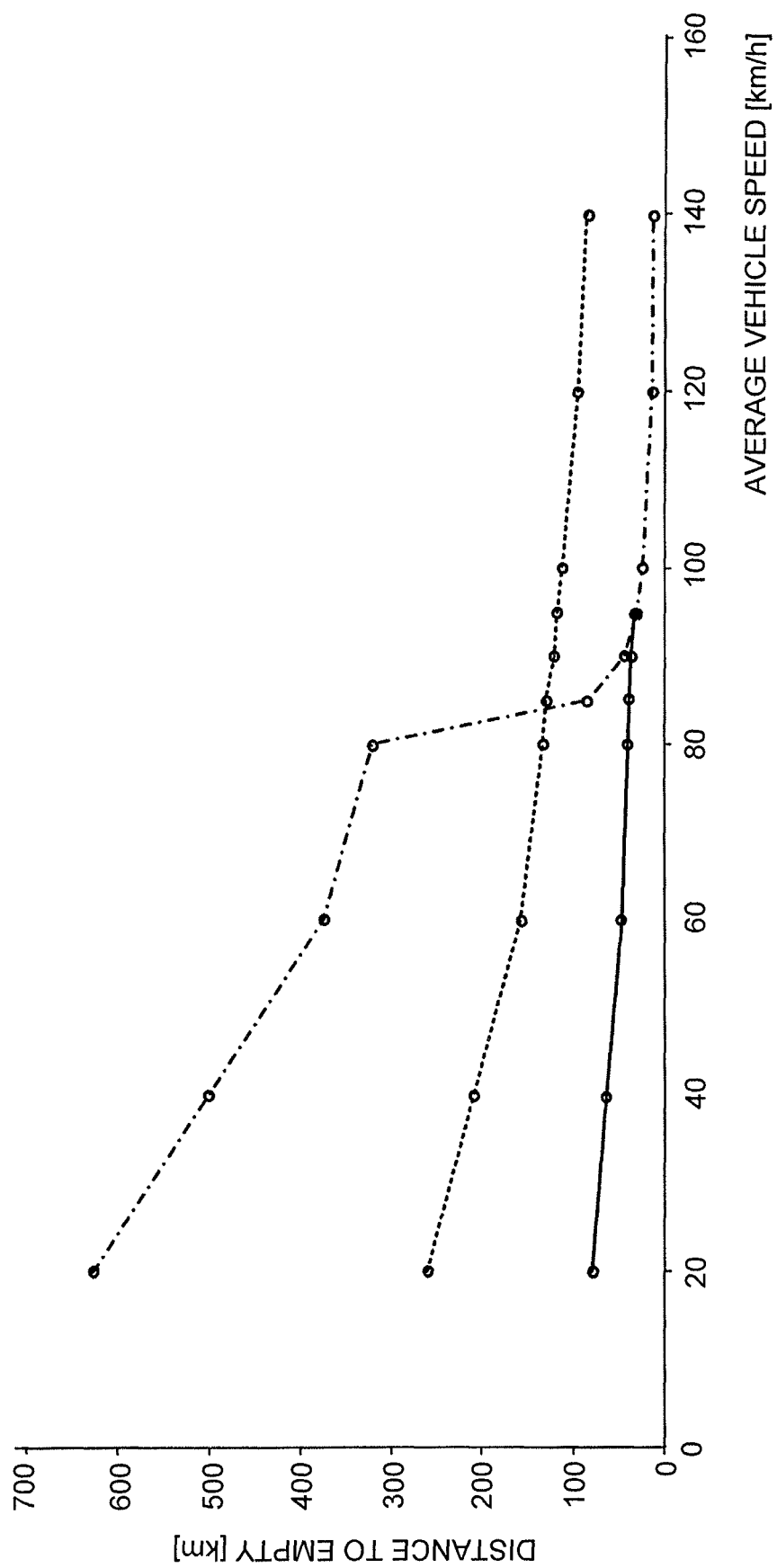
FIG. 4 is a diagram showing changes in a distance to empty caused by differences in an amount of fuel remaining and a battery SOC.

FIG. 4 is a diagram showing changes in a distance to empty caused by differences in an amount of fuel remaining and a battery SOC on the premise of the above-described characteristics. The horizontal axis indicates a vehicle speed [km/h], and the vertical axis indicates a distance to empty [km]. In the drawing, changes in a distance to empty in a case where an amount of fuel remaining is 10%, and a battery SOC is 10% (a solid line), changes in a distance to empty in a case where an amount of fuel remaining is 10%, and a battery SOC is 100% (a full charge) (a broken line), and changes in a distance to empty in a case where an amount of fuel remaining is 100% (a full load of fuel), and a battery SOC is 10% (a dashed-dotted line) are shown in line graphs.

From the drawing, it can be seen that in a fuel state where an amount of fuel remaining is 100%, and a battery SOC is 10% (the dashed-dotted line), a distance to empty drops sharply around the point at which the vehicle speed has exceeded 80 [km/h]. This is because, as described above, on high-load running like at a vehicle speed exceeding 80 [km/h], a power output required of the vehicle is higher than the generating power output of the fuel cell 3, and it takes more than the generating power output of the fuel cell 3 to generate the vehicle required power output, thus it is not possible to continue the high-load running.

Meanwhile, it can be seen that in a fuel state where an amount of fuel remaining is 10%, and a battery SOC is 100% (the broken line), although a distance to empty is about 260 [km] at a maximum, a distance to empty of 100 [km] or more can be ensured even on high-load running at a vehicle speed exceeding 80 [km/h]. This is because a power output of the battery 2 is higher than that of the fuel cell, and is enough to cover the power output required of the vehicle on the high-load running.

That is, in the series hybrid vehicle to which the present invention is applied, a distance to empty may greatly change depending on whether a vehicle required power output on a route to a destination is high or low. In other words, an increase of the distance to empty may greatly change depending on whether a charging operation on the battery 2 or refueling of the fuel cell stack 3 is selected.

Thus, when the driver considers if the vehicle can arrive at the destination, whether or not to use an expressway, and something, it may be difficult to determine whether a necessary (an efficient) energy replenishment operation is a charging operation on the battery 2 or refueling of the fuel cell stack 3.

Accordingly, in the control according to the present embodiment, in addition to a distance to empty found from the current fuel cell, respective distances to empty in a case where the battery 2 is charged, a case where the vehicle is refueled, and a case where both charging and refueling are performed are calculated. Then, the calculated distances to empty on these conditions are notified (indicated) to the driver so that the driver can correctly select a necessary refueling operation.

The control for causing the controller 8 to notify of (indicate) a necessary energy replenishment operation to the driver is described below.

Figure 5:
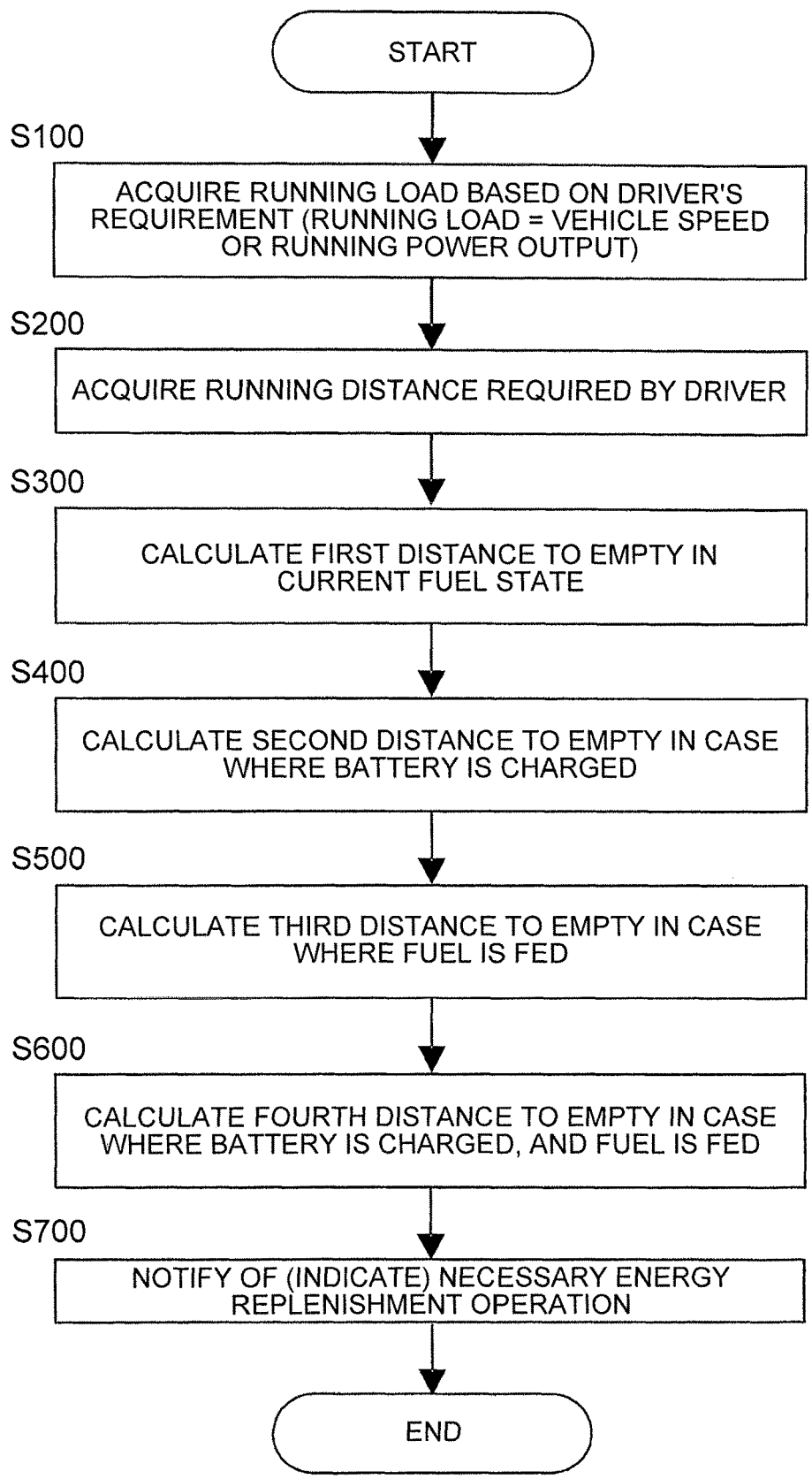
FIG. 5 is a flowchart showing a control routine until a necessary energy replenishment operation is notified to a driver.

FIG. 5 is a flowchart showing a control routine until the controller 8 notifies the driver of a necessary energy replenishment operation. This control routine is programmed to be repeatedly executed by the controller 8, for example, at intervals of about a few milliseconds.

At Step S100, the controller 8 estimates a running state that the driver requires, i.e., a running load of the drive motor 1 based on the driver's requirement. The running load here is estimated from a required vehicle speed or required running power output that the driver requires. The required vehicle speed is acquired from a detection value of the accelerator position sensor 10 or a vehicle speed sensor (not shown). A method of acquiring the required running power output (hereinafter, also referred to as the "required power output") may be any of the following methods. It is to be noted that the following is described on the assumption that the running load here is based on the required power output.

A first method is a method of calculating a power output that the driver requires, for example, by map retrieval or the like on the basis of a running state, i.e., a detection value of the accelerator position sensor 10 and a detection value of the vehicle speed sensor (not shown) and setting this calculated power output as a required power output.

A second method is a method of using an average value calculated on the basis of accumulated past running data. For example, changes of a required power output over the last one hour are accumulated as running data, and an average value of these is set as a required power output. It is to be noted that a period for which running data is accumulated is not limited to the last one hour, and various settings, for example, such as the last 30 minutes and a period from the start of a trip this time until the present, can be made.

A third method is a method of using a preset value. For example, a typical required power output in each running state is set in advance, and a required power output to be used is determined on the basis of the current running state.

A fourth method is a method of using a required power output in a case of high-load running regardless of the current running state. In this method, it is necessary to set the required power output in the case of high-load running in advance.

A fifth method is a method of using a required power output in a case of low-load running regardless of the current running state. In this method, it is necessary to set the required power output in the case of low-load running in advance.

A sixth method is a method of implementing both of the fourth and fifth methods.

It is to be noted that at Step S100, the driver may select one from the first to sixth methods, and a required power output may be acquired by the selected method.

At Step S200, the controller 8 acquires a running distance that the driver requires. The running distance here is a running distance from the present location to a destination. The running distance to the destination is acquired from, for example, a route guidance device (a car navigation system, not shown) that the vehicle is equipped with, and has the destination set therein by an occupant of the vehicle.

At Step S300, a distance to empty in a state where the required power output acquired at Step S100 is fulfilled is calculated on the basis of the current fuel state (a battery SOC and an amount of fuel remaining). A specific calculation method is described with FIG. 6.

Figure 6:
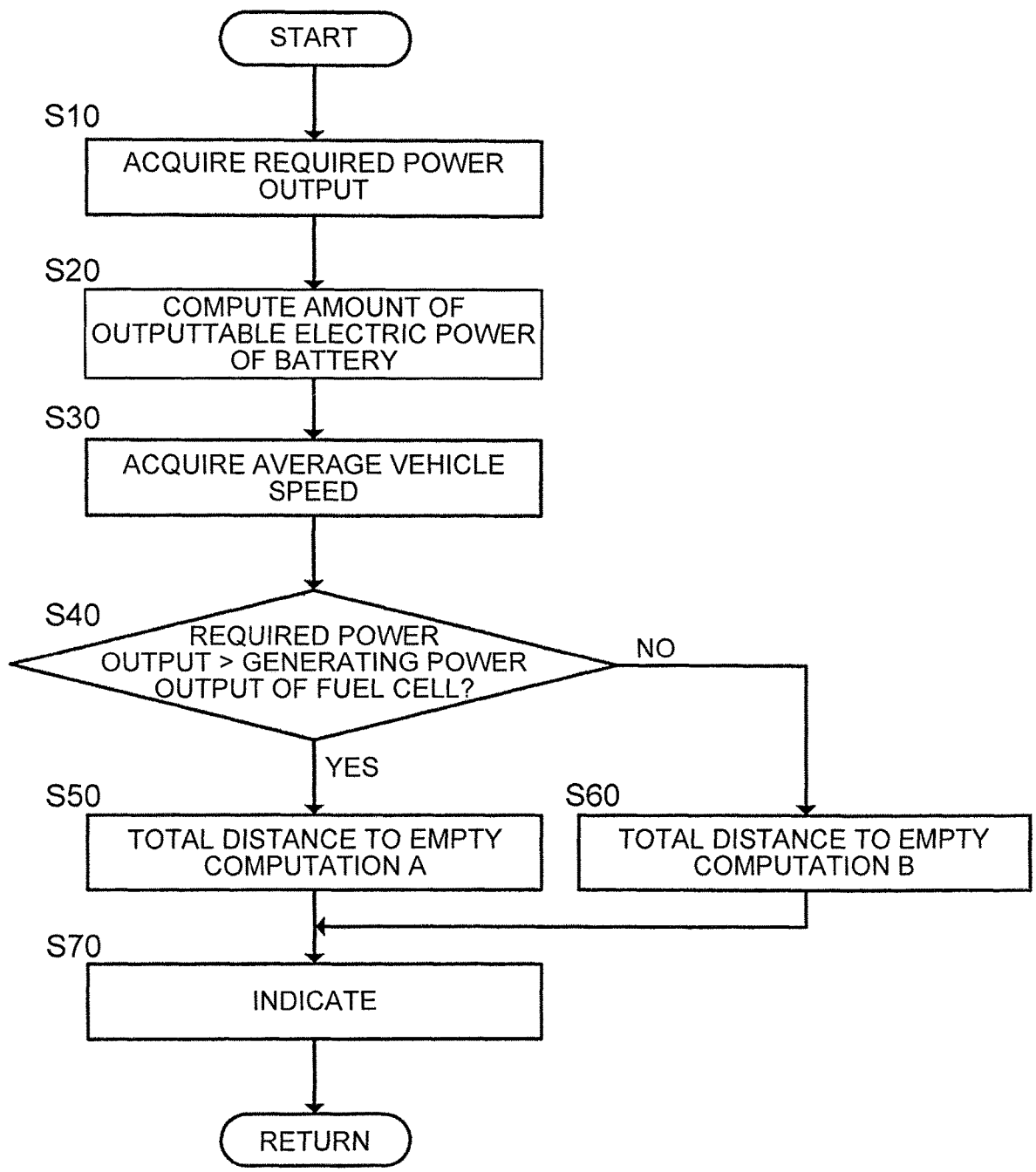
FIG. 6 is a flowchart showing a control routine to calculate the distance to empty.

FIG. 6 is a flowchart showing a control routine to calculate a distance to empty, which is the process at Step S100 in the flow (hereinafter, also referred to as the "notification flow") shown in FIG. 5. It is to be noted that this control routine is executed in a state where a start-up operation on the fuel cell stack 3 has been finished.

In the present embodiment, as described below, respective total distances to empty in a case where a required power output is higher than the generating power output of the fuel cell stack 3 and a case where a required power output is lower than the generating power output of the fuel cell stack 3 are calculated by different methods.

At Step S10, the controller 8 acquires a required power output. A method of acquiring the required power output is as described in description of Step S100 in the flow shown in FIG. 5. It is to be noted that in a case where the required power output is acquired at Step S100 in the notification flow, this step is omitted.

At Step S20, the controller 8 calculates an amount of outputtable electric power of the battery that is an amount of electric power which can be output on an amount of charge remaining in the battery 2. A method of the calculation may be a method of performing a computation using an equation where an SOC of the battery 2 is used as a parameter, or may be a method of mapping a relationship between an SOC and an amount of outputtable electric power of the battery 2 in advance and retrieving this.

It is to be noted that an SOC of the battery 2 may be acquired, for example, by causing the current sensor 9 to detect values of currents output and input to the battery 2 and adding up the values, or may be acquired by other existing techniques.

At Step S30, the controller 8 acquires an average vehicle speed. The average vehicle speed here is an average value of vehicle speed in a case of running on the required power output acquired at Step S10. A computation using an equation where the required power output is used as a parameter may be performed; alternatively, a relationship between a required power output and an average vehicle speed may be mapped in advance, and this may be retrieved. It is to be noted that in a case where the required vehicle speed is acquired at Step S100 in the notification flow, this step is omitted.

At Step S40, the controller 8 determines whether or not the required power output is higher than the generating power output of the fuel cell stack 3. The generating power output used here is basically the maximum generating power output of the fuel cell stack 3; however, for example, in a case where the generating power output of the fuel cell stack 3 is limited for a reason such as the fuel cell stack 3 being in a cooled state, a limited value is used.

In a case where a result of the determination is yes, the controller 8 performs a total distance to empty computation A at Step S50, and, in a case where a result of the determination is no, performs a total distance to empty computation B at Step S60.

The total distance to empty computation A is described.

As described above, in a case where the required power output is higher than the generating power output of the fuel cell stack 3, if the battery 2 has no charge remaining, i.e., if all of outputtable electric power of the battery 2 has been used up, the vehicle cannot run on the required power output even if there is some fuel left. In other words, as long as an excess of the required power output with respect to the generating power output of the fuel cell stack 3 is covered by the amount of outputtable electric power of the battery 2, the vehicle can run on the required power output. That is, a running distance until the amount of outputtable electric power of the battery 2 has been used up by the excess of the required power output with respect to the generating power output of the fuel cell stack 3 becomes a total distance to empty. This is represented by Equation (1). It is to be noted that Equation 1 that calculates the total distance to empty computation A is based on the premise that the fuel cell stack 3 continues being supplied with fuel in a period in which the vehicle runs the distance. A process in a case where the fuel cell is short of fuel for running the distance will be described later in a second embodiment.

$$L\text{total}=W\text{bat [kWh]} \div (F\text{ [kW]}-P\text{ [kW]}) \times V\text{ave [km/h]} \quad (1)$$

where Ltotal denotes a total distance to empty; Wbat denotes an amount of outputtable electric power of the battery; F denotes a required power output; P denotes a generating power output of the fuel cell; and Vave denotes an average vehicle speed.

It is to be noted that Wbat, the amount of outputtable electric power of the battery, in Equation (1) at this step is based on the current fuel state. For example, if the average vehicle speed when the required power output is 20 [kW], the generating power output of the fuel cell is 15 [kW], the current amount of outputtable electric power of the battery is 10 [kWh], and the required power output is 20 [kW] is 100 [km/h], Equation (1) is solved as follows.

$$L\text{total} = 10 \text{ [kWh]} \div (20 \text{ [kW]} - 15 \text{ [kW]}) \times 100 \text{ [km/h]}$$
$$= 2 \text{ [h]} \times 100 \text{ [km/h]}$$
$$= 200 \text{ [km]}$$

It is to be noted that the generating power output of the fuel cell depends on a specification of the fuel cell stack 3, and, if the required power output is determined, an average vehicle speed is also determined. Accordingly, the computation of Equation (1) is performed by substituting various values for the amount of outputtable electric power of the battery and the required power output, and a map of total distances to empty is created on the basis of results of the computation in advance, and then a total distance to empty can be found by map retrieval using the acquired amount of outputtable electric power of the battery and the acquired required power output. Finding the total distance to empty by map retrieval shall also be included in "calculate".

Next, the total distance to empty computation B is described.

The total distance to empty computation B is the calculation method of the above-described patent document. That is, it is a method of adding a distance to empty calculated on the basis of an amount of charge remaining in the battery 2 and a distance to empty calculated on the basis of electric power (hereinafter, also referred to as an "amount of remaining fuel electric power") obtained by using all the current amount of fuel remaining in the fuel tank to drive the fuel cell stack 3 to generate. This is represented by Equation (2).

$$L\text{total}=(W\text{bat [kWh]}+W\text{fuel [kWh]}) \div F\text{ [kW]} \times V\text{ave [km/h]} \quad (2)$$

where Ltotal denotes a total distance to empty; Wbat denotes an amount of outputtable electric power of the battery; Wfuel denotes an amount of remaining fuel electric power; F denotes a required power output; and Vave denotes an average vehicle speed.

If a required power output is equal to or lower than the generating power output of the fuel cell stack 3, the vehicle can run according to the required power output even after the battery 2 has run out of power; therefore, a correct total distance to empty can be calculated even by the calculation method of the above-described patent document. Accordingly, the calculation method of the above-described patent document is used as the total distance to empty computation B.

As with the total distance to empty A, the total distance to empty computation B may also be calculated by map retrieval. In this case, parameters used in the map retrieval are an amount of outputtable electric power of the battery, a required power output, and an amount of remaining fuel electric power. It is to be noted that in the following description, a total distance to empty calculated by the total distance to empty computation B is also referred to as a "total distance to empty B".

When the total distance to empty A or the total distance to empty B has been computed in this way, the controller 8 stores therein a result of the computation, and, to return to the notification flow, performs a process at the subsequent Step S400. It is to be noted that hereinafter, the total distance to empty A or the total distance to empty B calculated at Step S300 in the notification flow is referred to as the "first total distance to empty".

Figure 7:
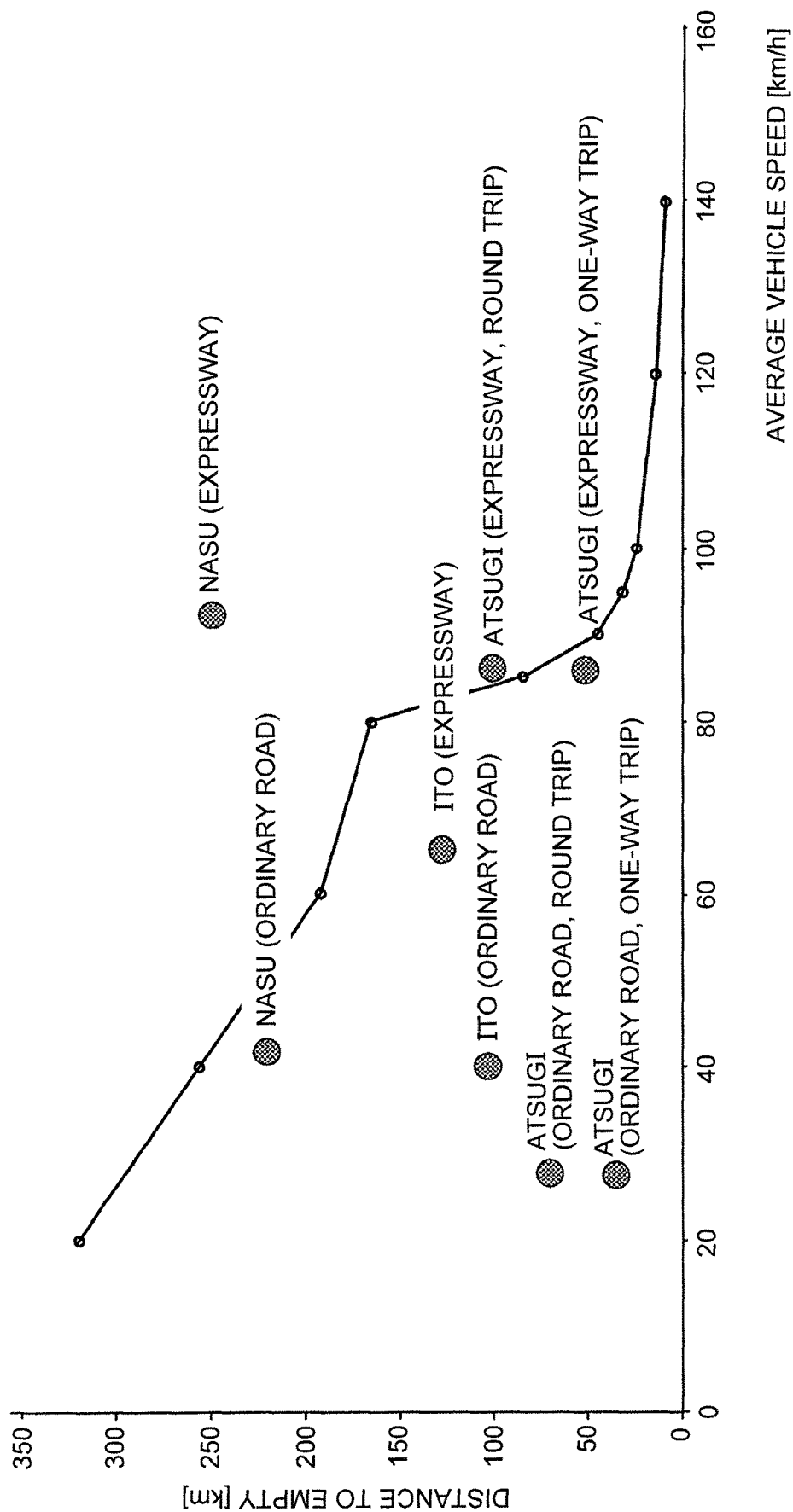
FIG. 7 is a diagram showing a total distance to empty B calculated from a current battery SOC and an amount of fuel remaining in accordance with an average vehicle speed until a destination in a graph.

Here, the distance to empty in the current fuel state calculated through the above-described processes at Steps S10 to S60 (the process at Step S300 in the notification flow) can be represented in a graph shown in FIG. 7.

FIG. 7 is a diagram showing a distance to empty (a total distance to empty B) calculated from a current battery SOC and an amount of fuel remaining in accordance with an average vehicle speed until a destination in a graph. The horizontal axis indicates the average vehicle speed to the destination, and the vertical axis indicates the distance to empty. However, the horizontal axis is not limited to the average vehicle speed, and may be an average running power output.

The average vehicle speed or average running power output here is calculated on the basis of route information to the destination that is acquired by the above-described route guidance device (the car navigation system) or the like or has been stored in advance. The route information is any one or more of factors that may change the vehicle speed and a running power output of the vehicle on a route to the destination, for example, the proportion of an expressway on the route to the destination, a running time slot, a traffic congestion state, road surface gradient information, etc. For example, the higher the proportion of an expressway, the higher the average vehicle speed and the average running power output. It is to be noted that a line graph (hereinafter, referred to simply as a "graph") in the drawing represents a distance to empty B in a state where the battery SOC is 10%, and the amount of fuel remaining is 50%.

Then, in the drawing, destination points, such as Nasu and Ito, with the average vehicle speed and the distance to empty as coordinates are plotted. Nasu (ordinary road) indicates the coordinates in a case of using an ordinary road, and Nasu (expressway) indicates the coordinates in a case of using an expressway along its route. It can be seen that despite the same Nasu, Nasu (ordinary road) and Nasu (expressway) are different in the average vehicle speed and the distance to empty.

From the same drawing, whether or not the vehicle can arrive at a destination can be determined according to a positional relationship between the graph and a plotted point. Specifically, the vehicle can arrive at a point plotted in a region where the average vehicle speed and the distance to empty are smaller than the graph. For example, it can be seen that if using the ordinary road, the vehicle can arrive at Nasu. On the other hand, it can be seen that in a case of using the expressway, the vehicle cannot arrive at Nasu. This is because an amount of fuel required for high-load running when the vehicle runs on the expressway cannot be covered by the current battery SOC (10%).

Here, if respective distances to empty in cases where refueling operations: a case (1) where the battery SOC is charged; a case (2) where the vehicle is refueled; and a case (3) where both charging and refueling are performed are performed can be further indicated, the driver can know which of the refueling operations (1) to (3) makes it possible for the vehicle to arrive at the destination in consideration of whether or not to use the expressway. In the following, a process for that is described with reference to FIG. 5.

At Step S400, in the case (1) where the battery SOC is charged, a distance to empty in a state where the required power output acquired at Step S100 is fulfilled is calculated. The distance to empty here is also calculated on the basis of the flowchart shown in FIG. 4; however, it differs from Step S300 in the following points.

That is, in the calculation of the distance to empty at Step S400, the amount of outputtable electric power of the battery calculated at Step S20 in FIG. 6 is calculated as an amount of outputtable electric power in a state where the battery 2 is fully charged. It is to be noted that the state where the battery 2 is fully charged is a state where the battery 2 has reached a target maximum charge amount, and, in the present embodiment, for example, battery SOC=80%. Then, the calculated amount of outputtable electric power on a full charge is substituted for the variable Wbat (the amount of outputtable electric power of the battery) in each of Equation (1) used when the total distance to empty A is calculated at Step S50 and Equation (2) used when the total distance to empty B is calculated at Step S60.

This makes it possible to calculate a total distance to empty A and a total distance to empty B in a fuel state in the case where the battery SOC is fully charged from the current fuel state. The total distance to empty A or the total distance to empty B calculated here is hereinafter referred to as a "second distance to empty". It is to be noted that the amount of outputtable electric power used in the calculation of the distance to empty at Step S4 is not necessarily have to be set to a full charge as described above, and may be fittingly set to, for example, 50% or 25% if the battery 2 is charged from the current state.

At Step S500, in the case (2) where the vehicle is refueled, a distance to empty in a state where the required power output acquired at Step S1 is fulfilled is calculated. The distance to empty here is also calculated on the basis of the flowchart shown in FIG. 4; however, it differs from Step S300 in the following points.

That is, in the calculation of the distance to empty at Step S500, Wfuel, the amount of remaining fuel electric power, in Equation (2) used for the calculation of the total distance to empty B at Step S60 in FIG. 6 is set as an amount of remaining fuel electric power on a full load of fuel (amount of fuel remaining=100%).

This makes it possible to calculate a total distance to empty B in the case where the amount of fuel remaining in the fuel tank 7 is filled up to a full load of fuel from the current fuel state. The total distance to empty A and the total distance to empty B calculated here (at Step S500) are hereinafter referred to as a "third distance to empty". It is to be noted that the amount of remaining fuel electric power used in the calculation of the distance to empty at Step S500 is not necessarily have to be set to a full load of fuel (amount of fuel remaining=100%) as described above, and may be fittingly set to, for example, 50% or 25% if the vehicle is refueled from the current state.

At Step S600, in the case (3) where charging and refueling are performed from the current fuel state, a distance to empty in a state where the required power output acquired at Step S100 is fulfilled is calculated. The distance to empty here is also calculated on the basis of the flowchart shown in FIG. 4; however, it differs from Step S300 in the following points.

That is, in the calculation of the distance to empty at Step S600, as with at Step S400, the amount of outputtable electric power of the battery calculated at Step S20 in FIG. 6 is calculated as an amount of outputtable electric power in a state where the battery 2 is fully charged, and the calculated amount of outputtable electric power is substituted for the variable Wbat (the amount of outputtable electric power of the battery) in each of Equation (1) used when the total distance to empty A is calculated at Step S50 and Equation (2) used when the total distance to empty B is calculated at Step S60. In addition to this, as with at Step S500, Wfuel, the amount of remaining fuel electric power, in Equation (2) used for the calculation of the total distance to empty B at Step S60 in FIG. 6 is set as an amount of remaining fuel electric power on a full load of fuel (amount of fuel remaining=100%).

This makes it possible to calculate the total distance to empty A and the total distance to empty B in the case where the battery SOC is fully charged, and the amount of fuel remaining is filled up to a full load of fuel from the current fuel state. The total distance to empty A or the total distance to empty B calculated here is hereinafter referred to as a "fourth distance to empty". It is to be noted that the amount of outputtable electric power used in the calculation of the distance to empty at Step S600 is not necessarily have to be set to a full charge and a full load of fuel (amount of fuel remaining=100%) as described above, and may be fittingly set.

Through the above-described processes, in addition to the first distance to empty calculated from the current fuel state, the second distance to empty in the case (1) where the battery SOC is charged, the third distance to empty in the case (2) where the vehicle is refueled, and the fourth distance to empty in the case (3) where both charging and refueling are performed can be calculated. Then, at the subsequent Step S700, the controller 8 notifies the driver of information that helps determine a necessary energy replenishment operation to arrive at the destination on the basis of the calculated first to fourth distances to empty.

At Step S700, the controller 8 indicates the driver the necessary energy replenishment operation. A place to indicate can be any place as long as the driver can visually recognize it. For example, it may be indicated on an LCD screen of the above-described route guidance device (the car navigation system). Content indicated is, for example, a graph shown in FIG. 8.

Figure 8:
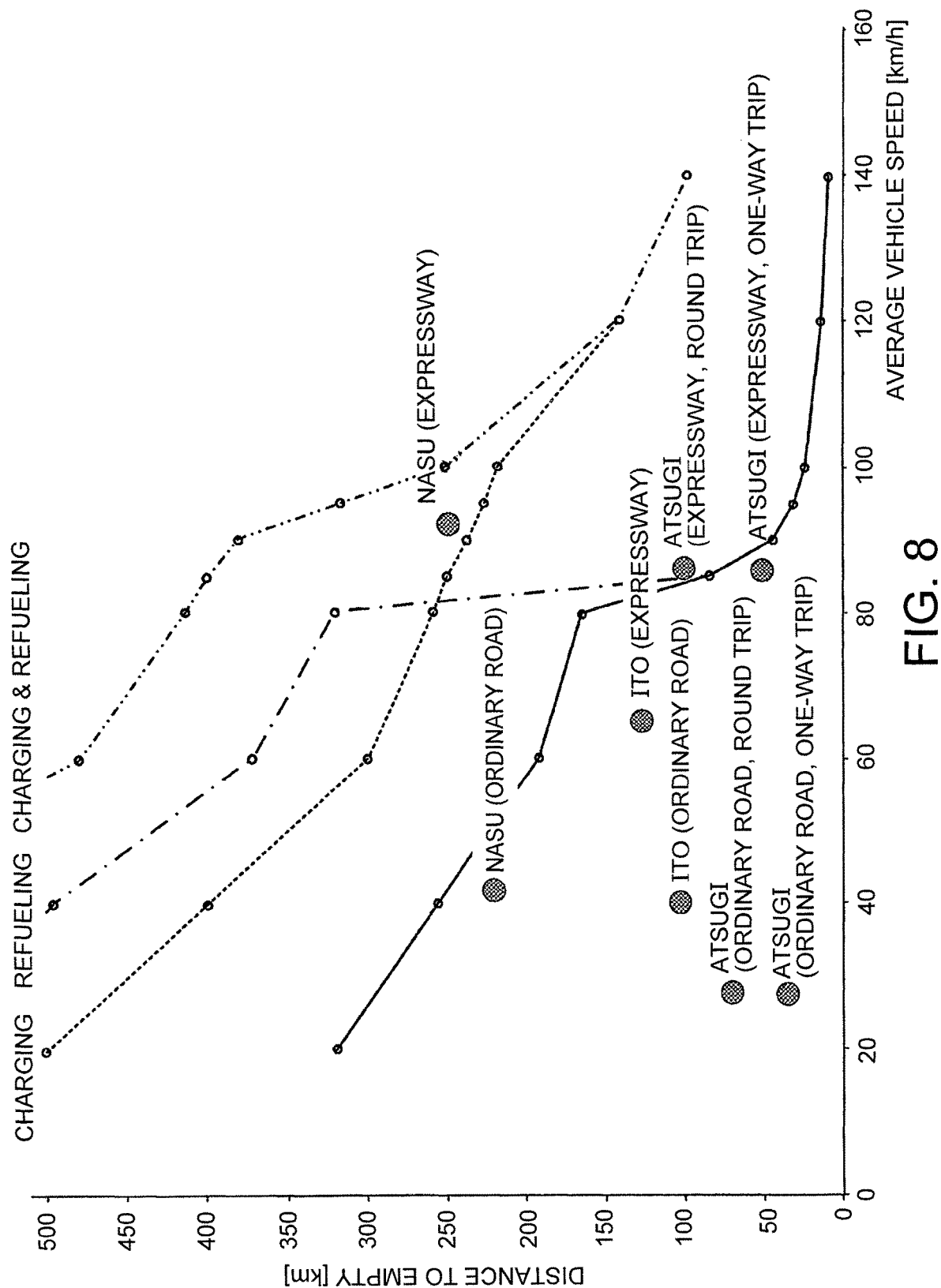
FIG. 8 is a diagram showing the necessary energy replenishment operation in a graph.

FIG. 8 is a diagram showing a necessary energy replenishment operation to arrive at a destination that is indicated to the driver. This drawing is a diagram showing first to fourth distances to empty in accordance with an average vehicle speed to the destination in graphs. The first distance to empty is indicated by a solid line; the second distance to empty is indicated by a broken line; the third distance to empty is indicated by a dashed-dotted line; and the fourth distance to empty is indicated by a dashed-two dotted line. The horizontal axis indicates the average vehicle speed to the destination, and the vertical axis indicates the distance to empty. However, the horizontal axis is not limited to the average vehicle speed, and may be an average running power output.

The average vehicle speed or average running power output here is calculated on the basis of route information to the destination that is acquired by the above-described route guidance device (the car navigation system) or the like or has been stored in advance. Contents of the route information are as described above with reference to FIG. 7.

As with FIG. 7, in the drawing, destination points, such as Nasu and Ito, with the average vehicle speed and the distance to empty as coordinates are plotted. Therefore, from a positional relationship between respective graphs of the first to fourth distances to empty and plotted points in FIG. 8, the driver can know which of the energy replenishment operations makes it possible for the vehicle to arrive at the destination on what kind of a route.

Specifically, also in FIG. 8, a destination that the vehicle can arrive at using an ordinary road or an expressway is plotted in a region where the distance to empty and the average vehicle speed are equal to or smaller than those of each line graph. Therefore, from the positional relationship between the graphs and the plotted points, the driver can easily know whether or not the vehicle can arrive at a destination, whether or not to use an expressway, what a necessary energy replenishment operation is, and something.

For example, it can be seen that the first distance to empty (the solid line) calculated from the current fuel state does not allow the vehicle to make a round trip to Atsugi using an expressway. Furthermore, it can be seen that the vehicle cannot arrive at Nasu using an expressway. Here, a necessary energy replenishment operation is determined from the drawing. From the third distance to empty (the dashed-dotted line) in the case where the vehicle is refueled, it can be seen that even if refueled, the vehicle cannot get to Nasu or make a round trip to Atsugi if using an expressway. Because the required power output on high-load running at 80 km/h cannot be covered by the generating power output of the fuel cell 3, the distance to empty in a running state at an average vehicle speed of 80 km/h or higher does not increase.

From the second distance to empty in the case where the battery 2 is charged, it can be seen that although an increase of the distance to empty on low-load running (at lower than 80 km/h) is smaller than that is in the case where the vehicle is refueled, the distance to empty on high-load running is increased, thus it is enough to make a round trip to Atsugi using an expressway. However, it can be seen that despite the increase of the distance to empty on high-load running, the vehicle cannot get to Nasu using an expressway.

From the fourth distance to empty (the dashed-two dotted line) in the case where both charging and refueling are performed, it can be seen that the vehicle can arrive at Nasu using an expressway. That is, for example, the driver who considered to go to Nasu using an expressway can easily and correctly determine from FIG. 8 that a necessary energy replenishment operation for that is both charging and refueling.

In this way, the driver is notified of the first to fourth distances to empty and destination information in a manner associated with each other, and thereby can easily determine a necessary energy replenishment operation to arrive at the destination on a desired route (such as an ordinary road or an expressway) by him/herself.

It is to be noted that the way of indicating the necessary energy replenishment operation indicated to the driver is not limited to the above-described form. For example, instead of indicating the graphs shown in FIG. 8, the necessary energy replenishment operation and available route information to arrive at the destination may be indicated in letters and numbers. Furthermore, the controller 8 may determine not information that helps the driver's determination but the necessary energy replenishment operation for the destination set by the driver and notify of only its result. At that time, information of whether an expressway can be used and whether or not a round trip can be made may be additionally indicated. Moreover, the indication (notification) method is not limited to the above-described visually recognizable form, and may by voice or something.

Furthermore, the timing to notify the driver of the necessary energy replenishment operation is not limited to the above-described timing. That is, it may be notified at a point of time when the first distance to empty in the current fuel state has been calculated at Step S300. Information able to be notified at this point of time may be shown, for example, in FIG. 7 described above. Even from this information, it can be seen that, for example, if replenished with a little more fuel, the vehicle is likely to be able to make a round trip to Atsugi using an expressway. At this time, if the driver knows that the battery 2 has to be charged to increase the distance to empty in a region of 80 km/h or higher, from the information of FIG. 7, the driver can determine that the necessary energy replenishment operation is charging.

Moreover, although not shown in FIG. 7, if the destination using an ordinary road is plotted in an upper region (where the distance to empty is large) of the line graph within a region of less than 80 km/h, the driver can determine that the necessary energy replenishment operation is refueling. Therefore, the timing to notify the driver of the necessary energy replenishment operation is not limited to the timing based on the flow of FIG. 5, and the necessary energy replenishment operation may be notified at a point of time when the first distance to empty in the current fuel state has been calculated at Step S300 by skipping Steps S400 to S600.

Furthermore, the first to fourth distances to empty calculated at Steps S300 to S600 do not necessarily have to be calculated on the basis of the driver required vehicle speed or required running power output acquired at Step S100 as described above, and may be calculated on the basis of a predetermined vehicle speed or the required running power output. Also in that case, by calculating the first to fourth distances to empty, for example, with each vehicle speed in increments of 1 km/h within vehicle speeds from 20 km/h to 140 km/h as the predetermined vehicle speed, it becomes possible to indicate the calculated distances to empty to be associated with an average vehicle speed from the present location to the destination as shown in FIG. 8.

Above are the details of the control routine until the necessary energy replenishment operation is notified to the driver. Subsequently, effects obtained by notifying the driver of the necessary energy replenishment operation are described.

FIG. 9 is a diagram showing what degree of error an increase of the distance to empty has in a case where a wrong energy replenishment operation is made, in other words, the degree of how little the distance increases despite driver's expectation. From the left, the vehicle speed [km/h], the distance to empty (the first distance to empty) [km] in the current fuel state, an increase [km] of the distance to empty in the case where the battery 2 is charged, an increase [km] of the distance to empty in the case where the vehicle is refueled, and an error [%] are shown. The error is the proportion of an increase [km] in the case where a wrong energy replenishment operation is performed to an increase [km] in the case where a right energy replenishment operation is performed.

From the drawing, it can be seen that on low-load running at a vehicle speed of 20 [km] to 80 [km], an increase of the distance to empty in the case where the vehicle is refueled is larger than that is in the case where the battery 2 is charged. Therefore, in a case of continuing the low-load running, refueling has to be selected as a correct energy replenishment operation. That is, if the driver selects an energy replenishment operation using his/her own judgement, and it is wrong (if charging is selected), the distance to empty can only be increased by about 67% of that is in the case where the vehicle is refueled.

On the other hand, on high-load running at a vehicle speed of 80 [km] or higher, the required electric power exceeds the generating power output of the fuel cell stack 3, thus the distance to empty is not increased even if the vehicle is refueled. Therefore, in a case of continuing the high-load running, charging has to be selected as a correct energy replenishment operation. That is, if the driver selects an energy replenishment operation using his/her own judgement, and it is wrong (if refueling is selected), the distance to empty cannot at all be increased despite his/her expectation.

In this way, the distance to empty may greatly change depending on the energy replenishment operation; therefore, if a wrong energy replenishment operation is selected, the distance to empty may be very short despite his/her expectation. By notifying the driver of a correct energy replenishment operation by the above-described method, it becomes possible to suppress a chance for the driver to make a mistake in selecting an energy replenishment operation and to eliminate the possibility of occurrence of a situation in which the distance to empty is short despite his/her expectation even though energy is replenished.

As above, according to a method of controlling the hybrid vehicle of the first embodiment, in the method of controlling the hybrid vehicle in which electric power of the battery 2 and electric power generated by an electric generator (the fuel cell 3) are supplied to a drive device (the drive motor 1), a running load of the drive motor 1 is estimated on the basis of the driver's requirement, and a first distance to empty that allows for running in a state where the estimated running load is fulfilled is calculated on the basis of an amount of charge remaining in the battery 2 and an amount of fuel remaining used to drive the fuel cell 3. Then, a required running distance is estimated on the basis of the driver's requirement, and on the basis of the first distance to empty and the required running distance, a necessary energy replenishment operation is notified to the driver. Accordingly, the driver can know whether or not the vehicle can arrive at a destination in the current fuel state and which energy replenishment operation is to be performed to arrive at the destination, and therefore can correctly determine a necessary energy replenishment operation to arrive at the destination.

Furthermore, according to the method of controlling the hybrid vehicle of the first embodiment, a running load of the drive motor 1 is acquired from the driver required vehicle speed or required power output. Thus, it is possible to acquire a running load depending on a running state that the driver desires, and therefore a correct energy replenishment operation can be notified to the driver.

Moreover, according to the method of controlling the hybrid vehicle of the first embodiment, the running load of the drive motor 1 is acquired from the average vehicle speed or the average power output from the present location until arrival at the destination. Thus, it is possible to correctly calculate a distance to empty depending on the average vehicle speed or average power output to the destination that changes depending on the destination set by the driver.

Furthermore, according to the method of controlling the hybrid vehicle of the first embodiment, the average vehicle speed or the average power output from the present location until arrival at the destination is calculated on the basis of route information to the destination. Then, according to the method of controlling the hybrid vehicle of the first embodiment, the route information is any one or more of the proportion of an expressway on a route to the destination, a running time slot, a traffic congestion state, and road surface gradient information. In this way, the average vehicle speed and the average power output are calculated in consideration of factors that may change the vehicle speed and a running power output of the vehicle on the route to the destination, thereby a more accurate, necessary energy replenishment operation can be notified to the driver.

Moreover, according to the method of controlling the hybrid vehicle of the first embodiment, the required running distance is a distance from the present location to the destination. Thus, it is possible to calculate whether the vehicle in the current or assumed fuel state can get from the present location to the destination.

Furthermore, according to the method of controlling the hybrid vehicle of the first embodiment, when the necessary energy replenishment operation is notified to the driver, either one or both of a charging operation on the battery 2 and a refueling operation on the fuel cell 3 are notified. Thus, the driver can easily and correctly determine which of the refueling operations, i.e., either one or both of the charging operation on the battery 2 and the refueling operation on the fuel cell 3 makes it possible to arrive at the destination.

Moreover, according to the method of controlling the hybrid vehicle of the first embodiment, when the necessary energy replenishment operation is notified, in a case where the charging operation on the battery 2 is performed, a second distance to empty that allows for running in a state where the driver required vehicle speed or required power output is fulfilled is calculated; in a case where the refueling operation on the fuel cell 3 is performed, a third distance to empty that allows for running in a state where the driver required vehicle speed or required power output is fulfilled is calculated; and in a case where the charging operation on the battery 2 and the refueling operation on the fuel cell 3 are performed, a fourth distance to empty that allows for running in a state where the driver required vehicle speed or required power output is fulfilled is calculated. Then, each of the first to fourth distances to empty in accordance with the average vehicle speed or the average power output from the present location until arrival at the destination is compared with the required running distance, thereby information that helps the driver determine (select) a necessary energy replenishment operation is notified. Thus, the driver can correctly and more easily determine which energy replenishment operation is to be performed to arrive at the destination.

Furthermore, according to the method of controlling the hybrid vehicle of the first embodiment, when the necessary energy replenishment operation is notified, the first to fourth distances to empty are shown in graphs in accordance with the average vehicle speed or average power output, and a point is plotted and indicated on the same indication screen as the graphs with the average vehicle speed or the average power output from the present location until arrival at the destination and the required running distance as the coordinate axes. Thus, the driver can visually recognize graphed information of the necessary energy replenishment operation, and thus can more easily and quickly determine a necessary energy replenishment operation to arrive at the destination.

Second Embodiment

A hybrid vehicle of the present embodiment has a system configuration similar to that of the first embodiment; however, the present embodiment differs from the first embodiment in some of a control routine to calculate and indicate a total distance to empty. In the following, differences are mainly described. It is to be noted that the control routine of the present embodiment is also executed in a state where the start-up operation on the fuel cell stack 3 has been finished, as with the first embodiment.

Figure 10:
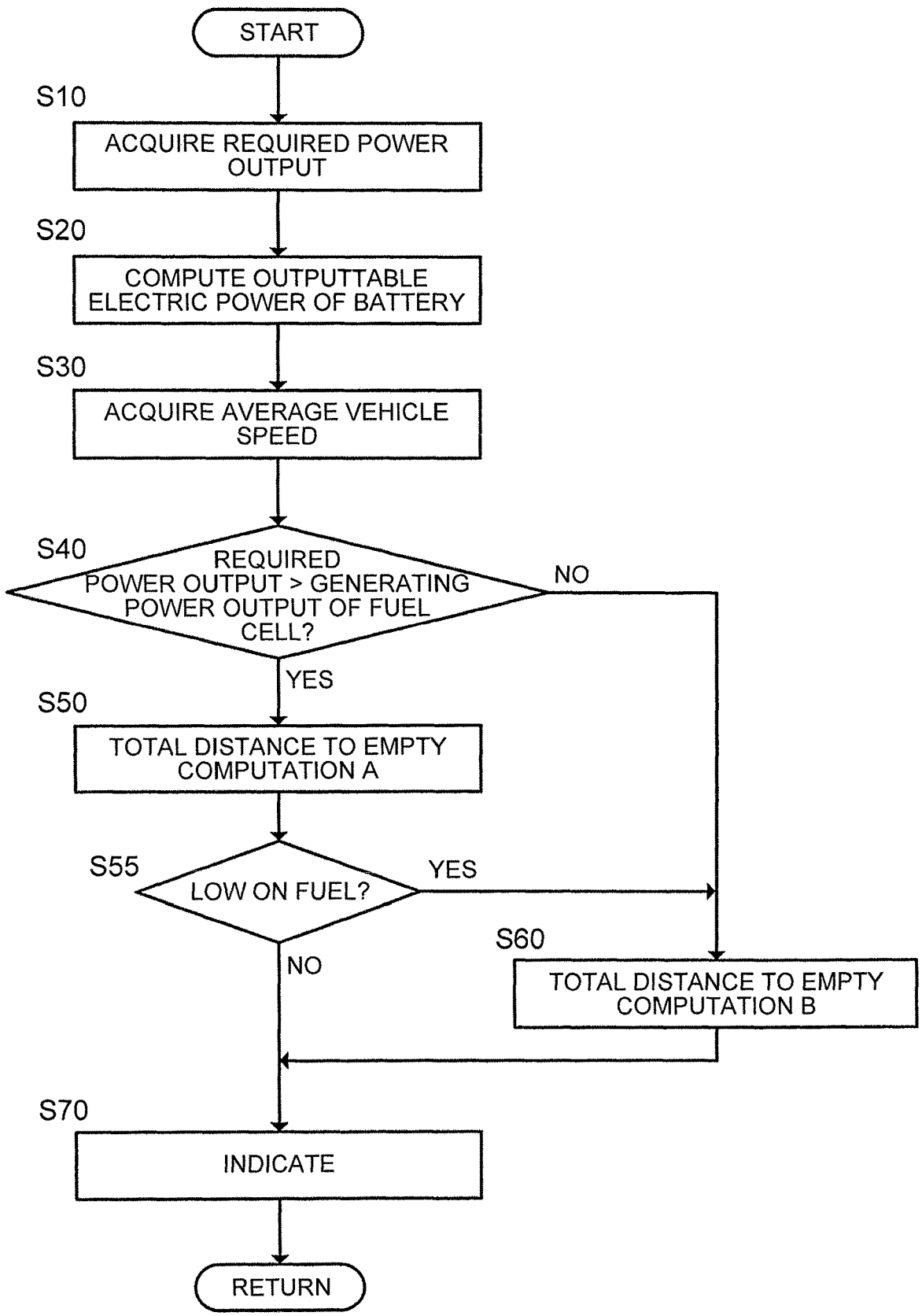
FIG. 10 is a flowchart showing a control routine to calculate a distance to empty in a second embodiment.

FIG. 10 is a flowchart showing the control routine to estimate a total distance to empty in the present embodiment. This control routine is repeatedly executed by the controller 8, for example, at intervals of about a few milliseconds. The control routine in FIG. 10 differs from the control routine in FIG. 6 in that after the controller 8 performs the total distance to empty computation A (Step S50), determination of whether or not the amount of fuel remaining in the fuel tank is short with respect to the amount required to run the total distance to empty A (Step S55) is performed.

The first total distance to empty computation is based on the premise that the fuel cell stack 3 continues being supplied with fuel during the period of running this distance. For example, as with the first embodiment, assume that the average vehicle speed when the required power output is 20 [kW], the generating power output of the fuel cell is 15 [kW], the current amount of outputtable electric power of the battery is 10 [kWh], and the required power output is 20 [kW] is 100 [km/h]. In this case, if an equation is modified as with the first embodiment, it allows for two-hour running at an average vehicle speed of 100 [km/h], thus a total distance to empty A results in 200 [km]. That is, a total distance to empty A of 200 [km] is a value based on the assumption that fuel lasts two hours.

However, for example, in a case where the rate of fuel consumption when a generating power output of the fuel cell stack 3 in Equation (1) is generated is 5 [L/h], and the amount of fuel remaining is 5 [L], the fuel cell stack 3 runs out of fuel in an hour, and thus the vehicle cannot run 200 [km].

Accordingly, the controller 8 determines whether or not the amount of fuel remaining in the fuel tank is short with respect to the amount required to run the total distance to empty A at Step S55. Specifically, first, the controller 8 calculates a time until there is no amount of fuel remaining from the rate of fuel consumption of the fuel cell stack 3 and the amount of fuel remaining. It is to be noted that the controller 8 has stored the rate of fuel consumption for each generating power output of the fuel cell stack 3 in advance. Furthermore, the amount of fuel remaining is detected by a publicly known method. For example, a fuel sensor is provided in the fuel tank 7 to detect the amount of fuel remaining.

Then, the controller 8 compares a time until no fuel is left with a possible running time calculated in the course of the total distance to empty computation A, and determines that it is short of fuel if the time until no fuel is left is shorter.

FIG. 11 is a diagram that compares the total distance to empty A and the total distance to empty B. The amount of outputtable electric power of the battery is 10 [kWh]; the amount of remaining fuel electric power is 15 [kWh]; and the required power outputs are 20 [kW], 25 [kW], and 30 [kW]. The amount of remaining fuel electric power is 15 [kWh], which means the amount of fuel remaining is 5 [L].

As described in the first embodiment, in a case where the required power output is higher than the generating power output of the fuel cell stack 3, the total distance to empty computation A can calculate a value closer to an actual distance to empty than the total distance to empty computation B. However, in FIG. 11, in a case where the required power output is 20 [kW], the total distance to empty A is 200 [km]; however, as described above, in reality, the vehicle cannot run 200 [km] due to a shortage of fuel. That is, the assumption of the total distance to empty computation A that fuel lasts falls apart, thus the accuracy of the total distance to empty A becomes worse than the total distance to empty B.

Accordingly, if a result of the determination at Step S55 is yes, the controller 8 performs the total distance to empty computation B at Step S60.

If a result of the determination is no, which means the vehicle can run the total distance to empty A, thus the controller 8 sets the total distance to empty A calculated at Step S50 as a first distance to empty, and returns to the notification flow (see FIG. 5).

As described above, in the present embodiment, either in a case where a driver required power output is lower than the maximum generating power output of the fuel cell 3 or in a case where a time until the battery 2 has run out of power that can be used for running is longer than a time until there is no more fuel used for power generation of the fuel cell 3, a total distance to empty is calculated by adding a distance to empty determined by an amount of charge remaining in the battery 2 and a distance to empty determined by an amount of electric power that is obtained by using all the amount of fuel remaining to generate. Furthermore, in a case where a driver required power output is higher than the maximum generating power output of the fuel cell and in a case where a time until the battery 2 has run out of power that can be used for running is equal to or shorter than a time until there is no more fuel used for power generation of the fuel cell 3, a shortage of generating power output of the electric generator with respect to the running power output and a distance to empty determined by an amount of charge remaining in the battery are calculated. According to this, in a case where the vehicle actually cannot run the total distance to empty A because it runs out of fuel earlier than electric power of the battery 2, the total distance to empty B with higher accuracy than the total distance to empty A can be calculated.

Third Embodiment

In the first and second embodiments, there is described the control routine to calculate a total distance to empty in a state where the start-up operation on the fuel cell stack 3 has been finished; however, in the present embodiment, there is described a control routine that can accurately calculate a total distance to empty even in a state where the fuel cell stack 3 is not in operation.

A hybrid vehicle to which the present embodiment is applied has a system configuration similar to the configuration of the first embodiment. In a situation where the fuel cell stack 3 is not in operation, this hybrid vehicle runs on only electric power of the battery 2. Furthermore, the fuel cell stack 3 used in the present embodiment is an SOFC; an SOFC takes more than a few tens of minutes between the start of the start-up operation and the end of the start-up operation.

Therefore, in a case where a total distance to empty is estimated in a state where the start-up operation on the fuel cell stack 3 has not been finished, it is necessary to consider that an SOC of the battery 2 and an amount of fuel remaining change in a time between the start of the start-up operation and the end of the start-up operation. Accordingly, in the present embodiment, a total distance to empty is estimated in consideration of the above-described changes.

Figure 12:
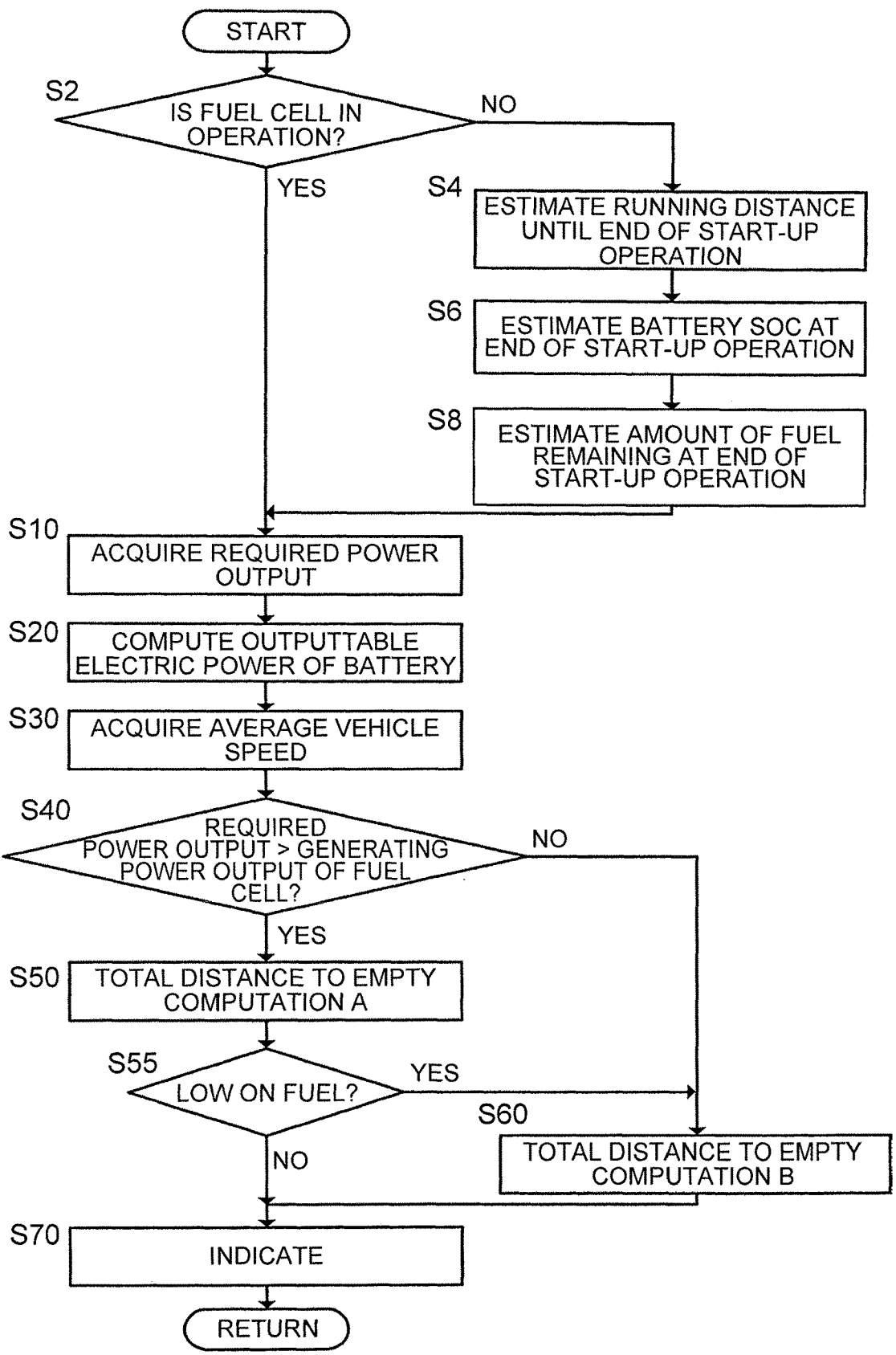
FIG. 12 is a flowchart showing a control routine to calculate a distance to empty in a third embodiment.

FIG. 12 is a flowchart showing the control routine to estimate a total distance to empty in the present embodiment. As described below, in a case where the fuel cell stack 3 is not in operation, the controller 8 calculates a total distance to empty by adding a running distance until the end of the start-up operation and a distance to empty after the end of the start-up operation. It is to be noted that this control routine is repeatedly executed by the controller 8, for example, at intervals of about a few milliseconds. Steps S10 to S70 are the same as the control routine shown in FIG. 11 according to the second embodiment.

In FIG. 12, before the process at Step S10 is performed, below-described processes at Steps S2 to S8 are performed.

At Step S2, the controller 8 determines whether or not the fuel cell stack 3 is in operation, and, in a case where the fuel cell stack 3 is in operation, performs the processes at Steps S10 and onward described in the second embodiment.

In a case where the controller 8 has determined that the fuel cell stack 3 is not in operation at Step S2, at Step S4, the controller 8 estimates a running distance until the end of the start-up operation. Specifically, the controller 8 stores therein a time taken between the start and the end of the start-up operation on the fuel cell stack 3 in advance, and estimates a running distance until the end of the start-up operation from this time and the above-described average vehicle speed.

At Step S6, the controller 8 estimates an SOC of the battery 2 at the end of the start-up operation. Specifically, the controller 8 calculates an amount of electric power consumed by running of the distance estimated at Step S2, and estimates an SOC of the battery 2 at the end of the start-up operation from this amount of electric power and a current SOC of the battery 2.

At Step S8, the controller 8 estimates an amount of fuel remaining at the end of the start-up operation. Specifically, the controller 8 calculates an amount of fuel consumed in a time between the start of the start-up operation and the end of the start-up operation, and estimates an amount of fuel remaining at the end of the start-up operation from this amount of fuel and a current amount of fuel remaining.

When having finished the process at Step S8, the controller 8 performs the processes at Steps S10 and onward. At that time, at Step S20, the controller 8 calculates an amount of outputtable electric power of the battery that is an amount of electric power which can be output in the battery SOC estimated at Step S6. At Step S50, the controller 8 sets a value obtained by adding the value calculated in the above-described first total distance to empty computation and the running distance until the end of the start-up operation as a total distance to empty A. At Step S60, the controller 8 calculates a total distance to empty by using Wfuel, an amount of remaining fuel electric power, in Equation (2) as an amount of electric power generated from the amount of fuel remaining at the end of the start-up operation, and sets a value obtained by adding this calculated value and the running distance until the end of the start-up operation as a total distance to empty B.

As described above, in the present embodiment, in a case where the fuel cell stack 3 is not in operation, the controller 8 estimates, on the basis of the required power output, the running distance until the start-up operation on the fuel cell stack 3 has been finished, and the amount of charge remaining in the battery 2 and the amount of fuel remaining at the point of time when the start-up operation has been finished. Then, the controller 8 performs the total distance to empty computation A or the total distance to empty computation B on the basis of the estimate of the amount of charge remaining in the battery 2 and the estimate of the amount of fuel remaining at the point of time when the start-up operation has been finished, thereby calculating a total distance to empty after the end of the start-up operation. The controller 8 sets the sum of the total distance to empty after the end of the start-up operation and the running distance until the start-up operation has been finished as a first total distance to empty. Accordingly, in a case where the fuel cell stack 3 is not in operation, the controller 8 can calculate a correct total distance to empty according to change in the SOC of the battery 2 and change in the amount of fuel remaining while waiting for the end of the start-up operation.

It is to be noted that in the first to third embodiments, there is described the case where the electric generator is the fuel cell system 200; however, it is not limited to this. For example, these embodiments are also applicable to a case where a system including an internal-combustion engine and an electric generator driven by the internal-combustion engine to generate electric power is used instead of the fuel cell system 200. Because in a case where a generating power output of the electric generator driven by the internal-combustion engine to generate electric power is lower than a required power output, there are problems similar to the problems solved in the first to third embodiments. Furthermore, a time between the start and the end of the start-up operation that the internal-combustion engine takes is greatly shorter than an SOFC, and an amount of change in the SOC of the battery 2 and changes in the amount of fuel remaining in the time between the start and the end of the start-up operation are negligible.

The embodiments of the present invention are described above; however, the above-described embodiments represent only some of application examples of the present invention, and are not intended to limit the technical scope of the present invention to the specific configurations thereof.

The invention claimed is:

1. A control method for a hybrid vehicle that supplies electric power of an externally rechargeable battery and electric power generated by an electric generator to a drive device, the control method comprising:
   estimating a running load of the drive device on a basis of a driver's requirement;
   calculating a first distance to empty that the hybrid vehicle is able to run in a state where the estimated running load is fulfilled on a basis of an amount of charge remaining in the battery and an amount of fuel remaining used to drive the electric generator;
   estimating a required running distance on a basis of the driver's requirement; and
   notifying the driver of, as a necessary energy replenishment operation, either one or both of a charging operation on the battery and a refueling operation on the electric generator on a basis of the first distance to empty and the required running distance,
   wherein the method further comprises:
      calculating, in a case where the charging operation on the battery is performed, a second distance to empty that the hybrid vehicle is able to run in a state where the estimated running load is fulfilled;
      calculating, in a case where the refueling operation on the electric generator is performed, a third distance to empty that the hybrid vehicle is able to run in a state where the estimated running load is fulfilled;
      calculating, in a case where both the charging operation on the battery and the refueling operation on the electric generator are performed, a fourth distance to empty that the hybrid vehicle is able to run in a state where the estimated running load is fulfilled; and
   wherein the notifying of the necessary energy replenishment operation includes comparing each of the first to fourth distances to empty corresponding to an average vehicle speed or an average power output from a present location until arrival at a destination with the required running distance, thereby notifying of information that allows the driver to select a necessary energy replenishment operation.

2. The control method for the hybrid vehicle according to claim 1, wherein the running load is acquired from a vehicle speed or a running power output that the driver requires.

3. The control method for the hybrid vehicle according to claim 1, wherein the running load is acquired from an average vehicle speed or an average running power output from a present location until arrival at a destination.

4. The control method for the hybrid vehicle according to claim 1, wherein the required running distance is a distance from a present location to a destination.

5. The control method for the hybrid vehicle according to claim 1, wherein the information includes which of replenishment operations (A) to (D) is required to travel the required running distance:
   (A) no energy replenishment operation is required;
   (B) only a charging operation on the battery is required;
   (C) only a refueling operation on the electric generator is required; and
   (D) both the charging operation and the refueling operation are required.

6. The control method for the hybrid vehicle according to claim 1, wherein the notifying of the necessary energy replenishment operation includes indicating the first to fourth distances to empty represented in graphs corresponding to the average vehicle speed or the average power output, and plotting and indicating respective points obtained by using the average vehicle speed or the average power output from the present location until arrival at the destination and the required running distance as coordinates on a same indication screen as the graphs.

7. The control method for the hybrid vehicle according to claim 3, wherein the average vehicle speed or the average power output from the present location until arrival at the destination is calculated on a basis of route information to the destination.

8. The control method for the hybrid vehicle according to claim 7, wherein the route information is any one or more of proportion of an expressway on a route to the destination, a running time slot, a traffic congestion state, or road surface gradient information.

9. A control method for a hybrid vehicle that supplies electric power of an externally rechargeable battery and electric power generated by an electric generator to a drive device, the control method comprising:
   estimating a running load of the drive device on a basis of a driver's requirement;
   calculating a first distance to empty that the hybrid vehicle is able to run in a state where the estimated running load is fulfilled on a basis of an amount of charge remaining in the battery and an amount of fuel remaining used to drive the electric generator;
   estimating a required running distance on a basis of the driver's requirement; and
   notifying the driver of, as a necessary energy replenishment operation, either one or both of a charging operation on the battery and a refueling operation on the electric generator on a basis of the first distance to empty and the required running distance,
   wherein at least either in a case where a power output that the driver requires is lower than a maximum generating power output of the electric generator or in a case where a time until the battery has run out of power that is able to be used for running is longer than a time until there is no fuel used for power generation of the electric generator, the first distance to empty is calculated by adding a distance to empty determined by an amount of charge remaining in the battery and a distance to empty determined by an amount of electric power that is obtained by using all the amount of fuel remaining to generate, and
   in a case where the power output that the driver requires is higher than the maximum generating power output of the electric generator and in a case where the time until the battery has run out of power that is able to be used for running is equal to or shorter than the time until there is no fuel used for power generation of the electric generator, a shortage of generating power output of the electric generator with respect to the required power output and the distance to empty determined by the amount of charge remaining in the battery are calculated.

10. A control device for a hybrid vehicle that supplies electric power of an externally rechargeable battery and electric power generated by an electric generator to a drive device, the control device comprising:

a running load estimating unit that estimates a running load of the drive device on a basis of a driver's requirement;

a first distance to empty calculating unit that calculates a first distance to empty that the hybrid vehicle is able to run in a state where the estimated running load is fulfilled on a basis of an amount of charge remaining in the battery and an amount of fuel remaining used to drive the electric generator;

a required running distance estimating unit that estimates a required running distance on a basis of the driver's requirement; and a notifying unit that notifies the driver of, as a necessary energy replenishment operation, either one or both of a charging operation on the battery and a refueling operation on the electric generator on a basis of the first distance to empty and the required running distance, wherein the device further comprises a second distance to empty calculating unit that calculates a second distance to empty that the hybrid vehicle is able to run in a state where the estimated running load is fulfilled in a case where the charging operation on the battery is performed;

a third distance to empty calculating unit that calculates a third distance to empty that the hybrid vehicle is able to run in a state where the estimated running load is fulfilled in a case where the refueling operation on the electric generator is performed; and a fourth distance to empty calculating unit that calculates a fourth distance to empty that the hybrid vehicle is able to run in a state where the estimated running load is fulfilled in a case where both the charging operation on the battery and the refueling operation on the electric generator are performed, and wherein the notifying unit compares each of the first to fourth distances to empty with the required running distance, thereby notifying of information that allows the driver to select a necessary energy replenishment operation.

11. The control device for the hybrid vehicle according to claim 10, wherein the information includes which of replenishment operations (A) to (D) is required to travel the required running distance:

(A) no energy replenishment operation is required;
(B) only a charging operation on the battery is required;
(C) only a refueling operation on the electric generator is required; and
(D) both the charging operation and the refueling operation are required.

* * * * *